United States Patent
Wang et al.

(10) Patent No.: US 12,255,334 B2
(45) Date of Patent: Mar. 18, 2025

(54) ELECTROCHEMICAL DEVICE AND ELECTRONIC DEVICE

(71) Applicant: Ningde Amperex Technology Limited, Fujian (CN)

(72) Inventors: Kefei Wang, Fujian (CN); Liang Shi, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 714 days.

(21) Appl. No.: 17/475,062

(22) Filed: Sep. 14, 2021

(65) Prior Publication Data

US 2022/0123319 A1    Apr. 21, 2022

Related U.S. Application Data

(63) Continuation of application No. PCT/CN2021/079031, filed on Mar. 4, 2021.

(51) Int. Cl.
*H01M 4/62* (2006.01)
*H01M 4/02* (2006.01)

(52) U.S. Cl.
CPC .......... *H01M 4/625* (2013.01); *H01M 4/623* (2013.01); *H01M 2004/027* (2013.01); *H01M 2004/028* (2013.01)

(58) Field of Classification Search
CPC . H01M 4/625; H01M 4/366; H01M 2004/027
See application file for complete search history.

(56) References Cited

U.S. PATENT DOCUMENTS

2014/0255796 A1*  9/2014  Matsuoka ............. H01M 4/139
                                                                 429/188
2020/0127333 A1*  4/2020  Oh .................... H01M 10/0568

FOREIGN PATENT DOCUMENTS

| CN | 103891028 | 6/2014 |
| CN | 104466261 | 3/2015 |
| CN | 108428867 A | 8/2018 |
| CN | 110323448 | 10/2019 |
| CN | 110323449 | 10/2019 |
| CN | 111082138 | 4/2020 |
| CN | 111129592 | 5/2020 |

(Continued)

OTHER PUBLICATIONS

JP2011049152 English translation. Yoshida et al. Japan. Mar. 10, 2011. (Year: 2011).*

(Continued)

*Primary Examiner* — Christopher P Domone
(74) *Attorney, Agent, or Firm* — Maier & Maier, PLLC

(57) ABSTRACT

An electrochemical device including a positive electrode, a negative electrode, and an electrolytic solution. The negative electrode includes a negative current collector and a negative active material layer formed on the negative current collector. The negative active material layer contains a negative active material. A conductive material is disposed between the negative active material layer and the negative current collector. An average particle diameter of the conductive material is smaller than that of the negative active material. The negative active material layer possesses a specific weight. The electrochemical device improves high-temperature cycle expansion performance and overcharge protection performance.

19 Claims, 1 Drawing Sheet

(56) References Cited

FOREIGN PATENT DOCUMENTS

| CN | 112151750 | | 12/2020 |
|---|---|---|---|
| JP | 2003249223 | | 9/2003 |
| JP | 2004288520 | * | 10/2004 |
| JP | 2007123141 | | 5/2007 |
| JP | 2010073618 | | 4/2010 |
| JP | 201149152 | A | 3/2011 |
| JP | 2013127860 | A | 6/2013 |
| JP | 2017054822 | | 3/2017 |
| JP | 2017073205 | A | 4/2017 |
| JP | 2018010880 | A | 1/2018 |
| JP | 6427544 | | 11/2018 |
| JP | 2020155415 | A | 9/2020 |
| KR | 20190010318 | | 1/2019 |
| KR | 20200044539 | | 4/2020 |

OTHER PUBLICATIONS

JP2020155415 English translation. Tamura et al. Japan. Sep. 24, 2020. (Year: 2020).*
JP2004288520 English translation. Fukui et al. Oct. 14, 2004. (Year: 2004).*
Wang, Kefei; International Search Report and Written Opinion for PCT Application No. PCT/CN2021/079031, filed Mar. 4, 2021; mailed May 7, 2021; 9 pages.
Wang, Kefei; Extended European Search Report for European Application No. 21763208.2, filed, Mar. 4, 2021, mailed May 16, 2022, 9 pages.
Wang, Kefei; Notice of Reasons for Refusal for Japanese Application No. 2021-523194, filed, Mar. 4, 2021, mailed Feb. 6, 2023, 6 pages.
Wang, Kefei; Request for the Submission of an Opinion for Korean Application No. 20217012867, filed, Mar. 4, 2021, mailed Mar. 13, 2023, 15 pages.
Office Action issued on Mar. 1, 2024, in corresponding Chinese Application No. 202011101403.7, 23 pages.

* cited by examiner

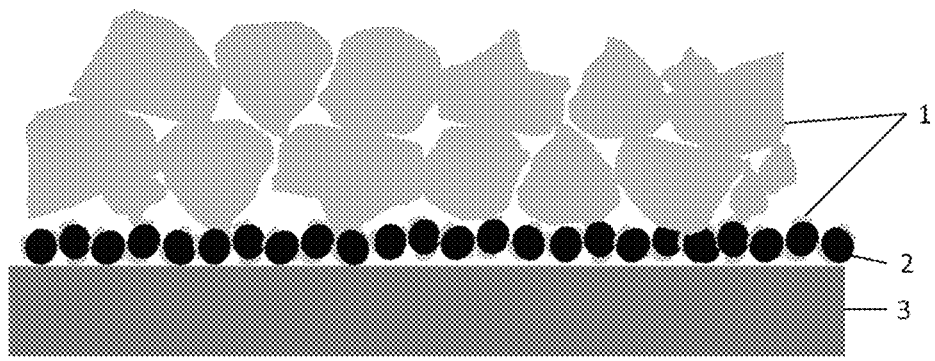

ELECTROCHEMICAL DEVICE AND ELECTRONIC DEVICE

This application is a continuation of PCT international application No. PCT/CN2021/079031, filed on 4 Mar. 2021, which claims the benefit of priority from the China Patent Application No. 202011101403.7, filed on 15 Oct. 2020, the disclosure of which is hereby incorporated by reference in its entirety.

BACKGROUND

1. Field of the Invention

This application relates to the field of energy storage, and specifically, to an electrochemical device and an electronic device.

2. Description of the Prior Art

By virtue of advantages of a high voltage, a small size, a light weight, a high specific capacity, no memory effect, no pollution, little self-discharge, and a long cycle life, electrochemical devices (such as a lithium-ion battery) have been widely used in many fields such as digital products, electric vehicles, and hybrid electric vehicles. The widespread application of the lithium-ion batteries is accompanied with more concern about the safety performance.

Safety hazards of the lithium-ion batteries mainly arise from internal overheating. If heat generated inside a lithium-ion battery cannot be dissipated quickly, a temperature of the lithium-ion battery will keep rising, thereby aggravating chemical reactions in the lithium-ion battery, and eventually leading to thermal runaway or even explosion, combustion and other accidents of the lithium-ion battery.

In view of this, it is indeed necessary to provide an electrochemical device and electronic device of improved performance.

SUMMARY

Embodiments of this application provide an electrochemical device and an electronic device, each possessing improved high-temperature cycle expansion performance and overcharge protection performance, to solve at least one safety problem in the related art to at least some extent.

According to one aspect of this application, this application provides an electrochemical device, including a positive electrode, a negative electrode, and an electrolytic solution. The negative electrode includes a negative current collector and a negative active material layer formed on the negative current collector. The negative active material layer contains a negative active material. A conductive material is disposed between the negative active material layer and the negative current collector. An average particle diameter of the conductive material is smaller than that of the negative active material. A weight per unit area of the negative active material layer is W mg/cm$^2$, where W is within a range of 3 to 12.

According to an embodiment of this application, the average particle diameter of the conductive material is less than or equal to 1 μm.

According to an embodiment of this application, the conductive material includes at least one of carbon black, carbon fiber, graphene, or carbon nanotube.

According to an embodiment of this application, a binder is further contained between the negative active material layer and the negative current collector.

According to an embodiment of this application, the binder includes at least one of styrene-butadiene rubber, a styrene-butyl acrylate copolymer, a styrene-(meth)acrylate copolymer, carboxymethyl cellulose, polyvinyl alcohol, polyacrylic acid sodium, polyvinylidene difluoride, polyimide, polyamide imide, or chitosan.

According to an embodiment of this application, the binder includes an organic binder that is vaporizable or decomposable.

According to an embodiment of this application, the organic binder includes at least one of a chitin-chitosan derivative, fluorine-containing resin, synthetic rubber, polyamide, polyimide, polyolefin, or polyacrylic resin.

According to an embodiment of this application, a tensile strength of the negative current collector is F N/mm$^2$, where F is greater than or equal to 400 and 100/3≤F/W≤150.

According to an embodiment of this application, a tensile strength of the negative current collector is F N/mm$^2$, a density of the negative active material layer is D g/cm$^3$, D is within a range of 1.4 to 2.0, and 560≤F×D≤1800.

According to an embodiment of this application, the electrolytic solution includes at least one of the following compounds:

(a) propionate;
(b) an organic compound containing a cyano group;
(c) lithium difluorophosphate; and
(d) a compound represented by Formula 1:

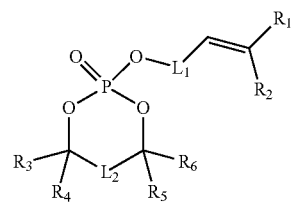

Formula 1 where
R$^1$, R$^2$, R$^3$, R$^4$, R$^5$, and R$^6$ are each independently hydrogen or a C$_1$ to C$_{10}$ alkyl group;
L$_1$ and L$_2$ are each independently —(CR$^7$R$^8$)n-;
R$^7$ and R$^8$ are each independently hydrogen or a C$_1$ to C$_{10}$ alkyl group; and
n is 1, 2, or 3.

According to an embodiment of this application, the compound represented by Formula 1 includes at least one of the following compounds:

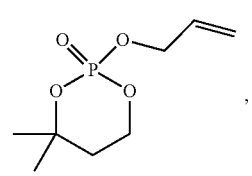

Formula 1-1

-continued

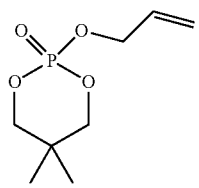
Formula 1-2,

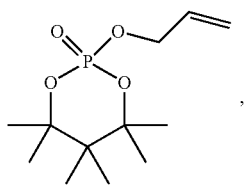
Formula 1-3,

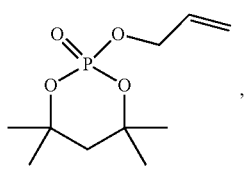
Formula 1-4,

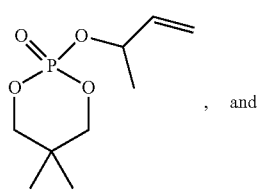
Formula 1-5, and

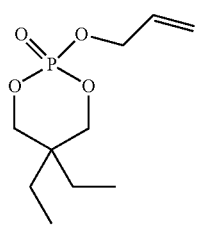
Formula 1-6.

According to an embodiment of this application, based on a weight of the electrolytic solution, a content of the organic compound containing a cyano group is a %, where a is within a range of 0.1 to 10.

According to an embodiment of this application, W and a satisfy: $0.3 \leq W/a \leq 20$.

According to another aspect of this application, this application provides an electronic device, including the electrochemical device according to this application.

Additional aspects and advantages of the embodiments of this application will be described or illustrated in part later herein or expounded through implementation of the embodiments of this application.

BRIEF DESCRIPTION OF DRAWINGS

For ease of describing the embodiments of this application, the following outlines the drawings necessary for describing the embodiments of this application. Apparently, the drawings outlined below are merely a part of embodiments in this application. Without making any creative efforts, a person skilled in the art can still obtain the drawings of other embodiments according to the structures illustrated in these drawings.

FIG. 1 is a schematic diagram of a negative electrode in an electrochemical device according to this application.

DETAILED DESCRIPTION

Embodiments of this application will be described in detail below. The embodiments of this application are not to be construed as a limitation on this application.

Unless otherwise expressly specified, the following terms used herein have the meanings defined below.

In the detailed description of embodiments and claims, a list of items referred to by using the terms such as "at least one of" may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements. The term "at least one type of" has the same meaning as the term "at least one of".

In the context hereof, the term "alkyl" is intended to be a linear saturated hydrocarbon structure possessing 1 to 20 carbon atoms. "Alkyl" is also intended to be a branched or cyclic hydrocarbon structure possessing 3 to 20 carbon atoms. A reference to an alkyl possessing a specific number of carbon atoms is intended to cover all geometric isomers possessing this specific number of carbon atoms. Therefore, for example, "butyl" is meant to include n-butyl, sec-butyl, isobutyl, tert-butyl, and cyclobutyl; and "propyl" includes n-propyl, isopropyl, and cyclopropyl. Examples of alkyl groups include, but are not limited to, methyl, ethyl, n-propyl, isopropyl, cyclopropyl, n-butyl, isobutyl, sec-butyl, tert-butyl, cyclobutyl, n-pentyl, isopentyl, neopentyl, cyclopentyl, methylcyclopentyl, ethylcyclopentyl, n-hexyl, isohexyl, cyclohexyl, n-heptyl, octyl, cyclopropyl, cyclobutyl, norbornyl, and the like.

In the context hereof, the term "halogenated" or "halo" means that hydrogen atoms in a group are substituted by halogen atoms (for example, fluorine, chlorine, bromine, or iodine) in part or in full.

The widespread application of electrochemical devices (such as lithium-ion batteries) is accompanied with more concern about the safety performance thereof. Safety hazards of an electrochemical device primarily arise from internal overheating. When the electrochemical device is in a high-temperature or overcharged state, the electrochemical device will be overheated inside, giving rise to safety hazards such as expansion, deformation and even explosion.

To solve such problems, a negative active material layer of a specific weight is applied in this application, and a slightly conductive material is disposed between the negative active material layer and a negative current collector to prevent a negative electrode from breaking during high-temperature cycles or in an overcharged state, thereby fully exerting a capacity of an electrochemical device and significantly improving high-temperature cycle expansion performance and overcharge protection performance of the electrochemical device.

In an embodiment, this application provides an electrochemical device, including the positive electrode, negative electrode, and electrolytic solution described below.

I. Negative Electrode

The negative electrode includes a negative current collector and a negative active material layer formed on one or two surfaces of the negative current collector. The negative active material layer contains a negative active material.

1. Conductive Material

The electrochemical device according to this application possesses a feature that a conductive material is disposed between the negative active material layer and the negative current collector. An average particle diameter of the conductive material is smaller than that of the negative active material. In the context hereof, the "conductive material" means a material of high electrical conductivity.

The surface of the negative current collector is relatively smooth, and is difficult to adhere to or support materials such as the negative active material. The conductive material disposed between the negative active material layer and the negative current collector not only increases conductivity at an interface between the negative current collector and the negative active material layer, but also roughs up the interface and increases adhesion between the negative current collector and the negative active material layer. As shown in FIGURE, the negative electrode of the electrochemical device according to this application includes a negative active material layer containing a negative active material 1, a negative current collector 3, and a conductive material 2 between the negative active material layer and the negative current collector. A part of the negative active material 1 is sandwiched in the conductive material 2 and is thereby firmly supported by the negative current collector 1. In addition, the conductive material is generally aggregated in a direction parallel to the surface of the negative current collector, but is hardly stacked in a direction perpendicular to the surface of the negative current collector. In this case, when the average particle diameter of the conductive material is smaller than that of the negative active material, the interface containing the conductive material and located between the negative current collector and the negative active material layer is very thin, and can significantly improve high-temperature cycle expansion performance and overcharge protection performance of the electrochemical device.

In some embodiments, the average particle diameter of the conductive material is less than or equal to 1 μm. In some embodiments, the average particle diameter of the conductive material is less than or equal to 0.8 μm. In some embodiments, the average particle diameter of the conductive material is less than or equal to 1 μm. In some embodiments, the average particle diameter of the conductive material is less than or equal to 0.5 μm. In some embodiments, the average particle diameter of the conductive material is less than or equal to 0.2 μm. In some embodiments, the average particle diameter of the conductive material is less than or equal to 0.1 μm. When the average particle diameter of the conductive material is within the foregoing range, the high-temperature cycle expansion performance and the overcharge protection performance of the electrochemical device are further improved.

In some embodiments, the conductive material is located in a region 3 μm below the negative current collector. In some embodiments, the conductive material is located in a region 2 μm below the negative current collector. In some embodiments, the conductive material is located in a region 1 μm below the negative current collector.

In some embodiments, in the region 3 μm below the negative current collector, based on a total volume of solid content materials, a content of the negative active material sandwiched in the conductive material is less than 10 vol %. In some embodiments, in the region 3 μm below the negative current collector, based on the total volume of solid content materials, the content of the negative active material sandwiched in the conductive material is less than 8 vol %. In some embodiments, in the region 3 μm below the negative current collector, based on the total volume of solid content materials, the content of the negative active material sandwiched in the conductive material is less than 5 vol %.

In some embodiments, a shape of the conductive material includes at least one of a granular shape and a fibrous shape.

In some embodiments, the conductive material includes at least one of carbon black, carbon fiber, graphene, or carbon nanotube. In some embodiments, the carbon black includes at least one of acetylene black, furnace carbon black, or Ketjen black.

2. Binder

In some embodiments, a binder is further contained between the negative active material layer and the negative current collector. The binder increases the bonding between the negative active material layer and the negative current collector. Applicable binders are generally resins characterized by the following characteristics: no decomposition during the preparation of the negative electrode, resistance to oxidation-reduction, volumetrically expanding in parallel with the charge and discharge of the electrochemical device, and preventing the interface between the negative current collector and the negative active material layer from breaking off due to expansion or contraction of the negative active material layer.

In some embodiments, the binder includes at least one of styrene-butadiene rubber, a styrene-butyl acrylate copolymer, a styrene-(meth)acrylate copolymer, carboxymethyl cellulose, polyvinyl alcohol, polyacrylic acid sodium, polyvinylidene difluoride, polyimide, polyamide imide, or chitosan.

In some embodiments, the binder includes an organic binder that is vaporizable or decomposable. In some embodiments, the organic binder evaporates or decomposes at a temperature within a range of 160° C. to 500° C. In some embodiments, the organic binder evaporates or decomposes at a temperature within a range of 200° C. to 400° C. In some embodiments, the organic binder evaporates or decomposes at a temperature within a range of 200° C. to 300° C. In a process of preparing the negative electrode, the negative active material layer is generally coated at a temperature lower than 120° C. Therefore, the organic binder will not evaporate or decompose in the coating process. The organic binder increases close adhesion between the negative current collector and the negative active material layer at a normal temperature. When the foregoing temperature is reached, the organic binder evaporates or decomposes, thereby implementing electrical isolation between the negative current collector and the negative active material layer and implementing insulation between the negative current collector and the negative active material layer. This prevents the electrochemical device from continuing to react chemically and overheating, and improves the high-temperature storage expansion performance and the overcharge protection performance of the electrochemical device.

In the context hereof, the terms "evaporation" and "decomposition" mean that the organic binder begins to deteriorate so that at least a part of the organic binder disappears. The term "electrical isolation" means a void generated in a position originally occupied by the organic binder after evaporation or decomposition. When electrical isolation occurs between the negative current collector and the negative active material layer, the content of the organic binder is reduced by 15% to 20%, or a resistance value between the negative current collector and the negative active material layer reaches 300Ω to 1000Ω as determined by a surface resistance of two terminals of the electrode.

In some embodiments, the organic binder includes at least one of a chitin-chitosan derivative, fluorine-containing resin, synthetic rubber, polyamide, polyimide, polyolefin, or polyacrylic resin.

In some embodiments, the chitin-chitosan derivative includes at least one of hydroxyethyl chitosan, hydroxypropyl chitosan, hydroxybutyl chitosan, or alkylated chitosan.

In some embodiments, the fluorine-containing resin includes at least one of polyvinylidene difluoride or polytetrafluoroethylene.

In some embodiments, the synthetic rubber includes at least one of styrene-butadiene rubber, acrylic rubber, or nitrile rubber.

In some embodiments, the polyolefin includes at least one of low-density polyethylene, high-density polyethylene, or polypropylene.

In some embodiments, the polyacrylic resin includes at least one of ethylene glycol dimethacrylate or propylene glycol dimethacrylate.

In some embodiments, the alkylated chitosan includes an organic binder made by mixing and crosslinking organic acids, where the organic acids include at least one of salicylic acid, pyromellitic acid, citric acid, or trimellitic acid.

The negative active material may be supported by a slightly conductive material. To be specific, the slightly conductive material can improve the adhesion between the negative current collector and the negative active material layer. Therefore, a lower content of binder may exist between the negative active material layer and the negative current collector.

3. Negative Active Material Layer

The negative active material layer may be one layer or a plurality of layers. Each layer in the multilayer negative active material may contain the same or different negative active materials. The negative active material is any material capable of reversibly intercalating and deintercalating metal ions such as lithium ions. In some embodiments, a chargeable capacity of the negative active material is greater than a discharge capacity of the positive active material, so as to prevent unexpected precipitation of lithium metal on the negative electrode during charging.

Another feature of the electrochemical device according to this application is that a weight per unit area of the negative active material layer is W mg/cm$^2$, where W is within a range of 3 to 12. In some embodiments, W is within a range of 5 to 10. In some embodiments, W is within a range of 6 to 8. In some embodiments, W is 3, 4, 5, 6, 7, 8, 9, 10, 11, or 12, or within a range formed by any two thereof. When the weight per unit area of the negative active material layer is within the foregoing range, the electrolytic solution is more infiltrative to the vicinity of the interface between the negative current collector and the negative active material layer, and improves electron transmission in the electrochemical device. In addition, the impact caused to the active material layer during processing is reduced, the interface between the negative current collector and the negative active material layer is well maintained, and a relative displacement between the negative active materials is reduced, thereby improving the high-temperature storage expansion performance and overcharge protection performance of the electrochemical device.

The weight per unit area of the negative active material layer in this application is a ratio of the mass (mg) of the negative active material layer to the area (cm$^2$) of the active material layer. The mass and area of the negative active material layer are obtained by the following method: cutting out a test sample of an appropriate size from the negative electrode, measuring an area S1 and a mass W0 of the sample, then peeling the negative current collector off the negative electrode, and measuring the mass W1 of the negative current collector. The mass of the negative active material layer is calculated from (W0−W1), and the weight per unit area=(W0−W1)/S1. If the selected negative electrode is coated with the active material layer on both sides, the weight per unit area=(W0−W1)/S1/2.

An exemplary method for peeling off the negative active material layer is: soaking the negative active material layer in a solvent that can dissolve or swell the negative active material layer, and wiping off the active material layer with a cloth or the like.

The weight per unit area of the negative active material layer may be adjusted by a known method. For example, in a case that the negative active material layer is formed by coating, the weight per unit area may be adjusted by changing the solid content concentration of a coating liquid used to form the negative active material layer, the number of times of coating, a gap at a coating liquid inlet of a coating machine, and the like. The weight per unit area of the negative active material layer may be increased by increasing the solid content concentration, increasing the number of times of coating, increasing the gap, or the like. The weight per unit area of the negative active material layer may be decreased by decreasing the solid content concentration, decreasing the number of times of coating, decreasing the gap, or the like.

In some embodiments, a density of the negative active material layer is 1.0 g/cm$^3$ to 2.0 g/cm$^3$. In some embodiments, the density of the negative active material layer is 1.2 g/cm$^3$ to 1.9 g/cm$^3$. In some embodiments, the density of the negative active material layer is 1.3 g/cm$^3$ to 1.8 g/cm$^3$. In some embodiments, the density of the negative active material layer is 1.5 g/cm$^3$ to 1.7 g/cm$^3$. In some embodiments, the density of the negative active material layer is 1.0 g/cm$^3$, 1.1 g/cm$^3$, 1.2 g/cm$^3$, 1.3 g/cm$^3$, 1.4 g/cm$^3$, 1.5 g/cm$^3$, 1.6 g/cm$^3$, 1.7 g/cm$^3$, 1.8 g/cm$^3$, 1.9 g/cm$^3$, 2.0 g/cm$^3$, or within a range formed by any two thereof. When the density of the negative active material layer is within the foregoing range, the negative active material is not fragile, and can maintain a relatively low initial irreversible capacity and maintain high electrical conductivity between the negative active materials. In addition, the density within the foregoing range makes the electrolytic solution more infiltrative to the vicinity of the interface between the negative current collector and the negative active material layer, thereby improving the high-temperature storage expansion performance and overcharge protection performance of the electrochemical device.

In some embodiments, the negative active material includes, but is not limited to, carbon materials such as graphite, hard carbon, soft carbon, mesocarbon microbead (MCMB); silicon; a silicon-containing compound such as a silicon oxide represented by SiO$_x$ (0<x<2); metallic lithium; metals combining with lithium into an alloy, and the alloy thereby formed; an amorphous compound whose majority is an oxide such as tin dioxide; and lithium titanate (Li$_4$Ti$_5$O1$_2$).

In some embodiments, the metals combining with lithium into an alloy include, but are not limited to, aluminum, silicon, tin, germanium, and the like.

In some embodiments, the negative active material is a metal or semimetal that combines with lithium into an alloy, or the alloy thereby formed, as represented by silicon and characterized by a high charge capacity and a high discharge capacity.

In some embodiments, the negative active material includes a mixture of a metal or semimetal or alloy with a carbon material of a graphite structure, where the metal or semimetal combines with lithium into the alloy and is represented by silicon.

In some embodiments, the negative active material contains a carbon material. In some embodiments, the negative active material contains a carbon material of a graphite structure. In some embodiments, the negative active material is at least one of artificial graphite or natural graphite.

In some embodiments, the negative active material includes different ingredients, and the carbon material of a graphite structure is a major ingredient. In some embodiments, based on the weight of the negative active material layer, the content of the carbon material of a graphite structure is greater than or equal to 70.0%. In some embodiments, based on the weight of the negative active material layer, the content of the carbon material of a graphite structure is greater than or equal to 90.0%. Based on the weight of the negative active material layer, the content of the carbon material of a graphite structure is greater than or equal to 95.0%.

In some embodiments, a median diameter (D50) of the carbon material is approximately 5 μm to approximately 30 μm. In some embodiments, the median diameter (D50) of the carbon material is approximately 10 μm to approximately 25 μm. In some embodiments, the median diameter (D50) of the carbon material is approximately 15 μm to approximately 20 μm. In some embodiments, the median diameter (D50) of the carbon material is approximately 3 μm, approximately 5 μm, approximately 7 μm, approximately 10 μm, approximately 15 μm, approximately 20 μm, approximately 25 μm, or approximately 30 μm, or within a range formed by any two thereof. When the median diameter of the carbon material is within the foregoing range, the irreversible capacity of the electrochemical device is relatively low, and the negative electrode can be evenly coated more easily. The median diameter (D50) of the carbon material means a volume-based average particle diameter measured by a laser diffraction/scattering, and may be measured by the following method: dispersing the carbon material in an aqueous solution (approximately 10 mL) containing 0.2 wt % polyoxyethylene (20) sorbitan monolaurate, and measuring the media diameter by using a laser diffraction/scattering particle size distribution analyzer (LA-700 manufactured by Horiba Ltd.).

In some embodiments, the negative active material layer includes a negative electrode binder, which can increase the bonding between the negative active materials. The type of the negative electrode binder is not particularly limited, as long as the material of the binder is stable to the electrolytic solution or to the solvent used in manufacturing the electrode. The negative binder may include a polymer material that can be dissolved or dispersed in the solvent used in manufacturing the negative electrode. In a case that an aqueous solvent is used in manufacturing the negative electrode, the polymer material that can be dissolved in water (that is water-soluble) includes, but is not limited to, cellulose polymers such as carboxymethyl cellulose (CMC), methyl cellulose (MC), cellulose acetate phthalate (CAP), and hydroxypropyl methylcellulose (HPMC); and polyvinyl alcohol (PVA), and the like. The polymer material that can be dispersed in water (water-dispersible) includes, but is not limited to, vinyl polymers such as polyethylene (PE) and polypropylene (PP); fluorine resins such as polyethylene oxide (PEO), polytetrafluoroethylene (PTFE), a tetrafluoro-ethylene-hexafluoropropylene copolymer (FEP), a tetrafluoroethylene-perfluoroalkyl vinyl ether copolymer (PFA); a vinyl acetate copolymer; and rubber such as styrene-butane rubber (SBR), acrylic modified SBR resin (SBR latex), and the like.

In some embodiments, in relation to the negative active material that is 100 in total, a content of the binder is less than or equal to 8 wt %. In some embodiments, in relation to the negative active material that is 100 in total, the content of the binder is less than or equal to 7 wt %. In some embodiments, in relation to the negative active material that is 100 in total, the content of the binder is less than or equal to 6 wt %. In some embodiments, in relation to the negative active material that is 100 in total, the content of the binder is less than or equal to 5 wt %. In some embodiments, in relation to the negative active material that is 100 in total, the content of the binder is less than or equal to 4 wt %. In some embodiments, in relation to the negative active material that is 100 in total, the content of the binder is less than or equal to 3 wt %. In some embodiments, in relation to the negative active material that is 100 in total, the content of the binder is less than or equal to 2 wt %.

A thickness of the negative active material layer means the thickness of the negative active material layer coated on a single side of the negative current collector. In some embodiments, the thickness of the negative active material layer is greater than or equal to 15 μm. In some embodiments, the thickness of the negative active material layer is greater than or equal to 20 μm. In some embodiments, the thickness of the negative active material layer is greater than or equal to 30 μm. In some embodiments, the thickness of the negative active material layer is less than or equal to 150 μm. In some embodiments, the thickness of the negative active material layer is less than or equal to 120 μm. In some embodiments, the thickness of the negative active material layer is less than or equal to 100 μm. In some embodiments, the thickness of the negative active material layer is within a range formed by any two of the foregoing values. When the thickness of the negative active material layer is within the foregoing range, the electrolytic solution can penetrate into the vicinity of the interface of the negative current collector, thereby improving the charge and discharge performance of the electrochemical device at a high current density. In addition, when a volume ratio of the negative current collector to the negative active material is within an appropriate range, a relatively high capacity of the electrochemical device can be ensured.

3. A Negative Current Collector

In some embodiments, a tensile strength of the negative current collector is F N/mm$^2$, where F is greater than or equal to 400. In some embodiments, F is greater than or equal to 450. In some embodiments, F is greater than or equal to 500. In some embodiments, F is greater than or equal to 550. In some embodiments, F is greater than or equal to 600. In some embodiments, F is greater than or equal to 650. In some embodiments, F is greater than or equal to 700. In some embodiments, F is greater than or equal to 800. In some embodiments, F is greater than or equal to 900. In some embodiments, F is greater than or equal to 1000. In the context hereof, the term "tensile strength" means a ratio of a maximum tensile force required to break the sample to a cross-sectional area of the sample. The negative current collector of a high tensile strength can suppress cracking of the negative current collector caused by the expansion/contraction of the negative active material layer during charge/discharge of the electrochemical device, thereby significantly improving the high-temperature cycle expansion performance and the overcharge protection performance of the electrochemical device.

In some embodiments, the tensile strength (F N/mm²) of the negative current collector and the weight per unit area (W mg/cm²) of the negative active material layer satisfy: 100/3≤F/W≤150. In some embodiments, 40≤F/W≤120. In some embodiments, 50≤F/W≤100. In some embodiments, 60≤F/W≤80. In some embodiments, F/W is 100/3, 40, 50, 60, 70, 80, 90, 100, 110, 120, 130, 140, or 150, or within a range formed by any two thereof. When the tensile strength (F N/mm²) of the negative current collector and the weight per unit area (W mg/cm²) of the negative active material layer satisfy the foregoing relationship, the high-temperature cycle expansion performance and the overcharge protection performance of the electrochemical device are further improved.

The tensile strength of the negative current collector may be measured by using the same instrument and method as those used for measuring an extensibility (with reference to the test method in the standard GB-228-87).

In some embodiments, a density of the negative active material layer is D g/cm³, where D is within a range of 1.4 to 2.0. In some embodiments, D is within a range of 1.5 to 1.8. In some embodiments, D is 1.4, 1.5, 1.6, 1.7, 1.8, 1.9, or 2.0, or within a range formed by any two thereof. When the density of the negative active material layer is within the foregoing range, the negative active material is not fragile, and can maintain a relatively low initial irreversible capacity and maintain high electrical conductivity between the negative active materials. In addition, the density within the foregoing range makes the electrolytic solution more infiltrative to the vicinity of the interface between the negative current collector and the negative active material layer, thereby improving the high-temperature cycle expansion performance and overcharge protection performance of the electrochemical device.

In some embodiments, the tensile strength (F N/mm²) of the negative current collector and the density (D g/cm³) of the negative active material layer satisfy: 560≤F×D≤1800. In some embodiments, 600≤F×D≤1500. In some embodiments, 700≤F×D≤1200. In some embodiments, 600≤F×D≤1500. In some embodiments, 800≤F×D≤1000. In some embodiments, F×D is 560, 600, 700, 800, 900, 1000, 1100, 1200, 1300, 1400, 1500, 1600, 1700, or 1800, or within a range formed by any two thereof. When the tensile strength (F N/mm²) of the negative current collector and the density (D g/cm³) of the negative active material layer satisfy the foregoing relationship, the high-temperature cycle expansion performance and the overcharge protection performance of the electrochemical device are further improved.

In some embodiments, the negative current collector includes, but is not limited to, a metal foil, a metal cylinder, a metal coil, a metal sheet, a metal film, a metal mesh, stamped metal, foamed metal, and the like. In some embodiments, the negative current collector is a metal foil. In some embodiments, the negative current collector is a copper foil. In the context hereof, the term "copper foil" includes a copper alloy foil.

In some embodiments, the negative current collector is a conductive resin. In some embodiments, the conductive resin includes a film obtained by evaporating copper on a polypropylene film.

Preparing a Negative Electrode

The negative electrode in the electrochemical device according to this application may be prepared using any known method. An exemplary method includes: adding a binder, a solvent, and, as appropriate, a thickener, a conductive material, a filler material, and the like, into a negative active material to form a slurry; coating a negative current collector with the slurry; and performing drying and calendering to form an electrode. Alternatively, the negative active material may be calendered into a sheet-shaped electrode, or compressed into a particle electrode.

II. Electrolytic Solution

The electrolytic solution used in the electrochemical device according to this application includes an electrolyte and a solvent that dissolves the electrolyte. In some embodiments, the electrolytic solution used in the electrochemical device according to this application further includes an additive.

According to some embodiments of this application, the electrolytic solution further includes at least one of the following compounds:

(a) propionate;
(b) an organic compound containing a cyano group;
(c) lithium difluorophosphate; and
(d) a compound represented by Formula 1:

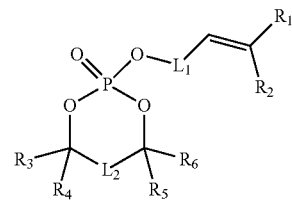

Formula 1 where
$R^1$, $R^2$, $R^3$, $R^4$, $R^5$, and $R^6$ are each independently hydrogen or a $C_1$ to $C_{10}$ alkyl group;
$L_1$ and $L_2$ are each independently —$(CR^7R^8)_n$—;
$R^7$ and $R^8$ are each independently hydrogen or a $C_1$ to $C_{10}$ alkyl group; and
n is 1, 2, or 3.

(a) Propionate

According to some embodiments of this application, the propionate includes a compound represented by Formula 2:

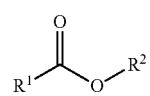

Formula 2 where
$R^1$ is an ethyl group or a haloethyl group; and
$R^2$ is a $C_1$ to $C_6$ alkyl group or a $C_1$ to $C_6$ haloalkyl group.

In some embodiments, the propionate includes, but is not limited to, methyl propionate, ethyl propionate, propyl propionate, butyl propionate, pentyl propionate, halogenated methyl propionate, halogenated ethyl propionate, halogenated propyl propionate, halogenated butyl propionate, and halogenated pentyl propionate. In some embodiments, the propionate is at least one of methyl propionate, ethyl propionate, propyl propionate, butyl propionate, or pentyl propionate. In some embodiments, a halogen group in the halogenated methyl propionate, halogenated ethyl propionate, halogenated propyl propionate, halogenated butyl propionate, and halogenated pentyl propionate is one or more of a fluorine group (—F), a chlorine group (—Cl), a bromine group (—Br), or an iodine group (—I). In some embodiments, the halogen group is a fluorine group (—F), which can achieve more excellent effects.

In some embodiments, based on a weight of the electrolytic solution, a content of the propionate is within a range of 10% to 65%. In some embodiments, based on the weight of the electrolytic solution, the content of the propionate is within a range of 15% to 60%. In some embodiments, based on the weight of the electrolytic solution, the content of the propionate is within a range of 30% to 50%. In some embodiments, based on the weight of the electrolytic solution, the content of the propionate is within a range of 30% to 40%. In some embodiments, based on the weight of the electrolytic solution, the content of the propionate is 10%, 15%, 20%, 25%, 30%, 35%, 40%, 45%, 50%, 55%, 60%, or 65%, or within a range formed by any two thereof. The content of the propionate falling within the foregoing ranges helps to achieve more excellent effects.

(b) Compound Containing a Cyano Group

In some embodiments, the compound containing a cyano group includes, but is not limited to, one or more of: succinonitrile, glutaronitrile, adiponitrile, 1,5-dicyanopentane, 1,6-dicyanohexane, tetramethyl succinonitrile, 2-methyl glutaronitrile, 2,4-dimethyl glutaronitrile, 2,2,4,4-tetramethyl glutaronitrile, 1,4-dicyanopentane, 1,2-dicyanobenzene, 1,3-dicyanobenzene, 1,4-dicyanobenzene, ethylene glycol bis(propionitrile) ether, 3,5-dioxa-pimelonitrile, 1,4-bis(cyanoethoxy)butane, diethylene glycol bis(2-cyanoethyl) ether, triethylene glycol bis(2-cyanoethyl) ether, tetraethylene glycol bis(2-cyanoethyl) ether, 1,3-bis(2-cyanoethoxy)propane, 1,4-bis(2-cyanoethoxy)butane, 1,5-bis(2-cyanoethoxy)pentane, ethylene glycol bis(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, or 1,2,5-tris(cyanoethoxy)pentane.

The foregoing compounds containing a cyano group may be used alone or combined arbitrarily. If the electrolytic solution includes two or more compounds containing a cyano group, the content of the compound containing a cyano group means a total content of the two or more compounds containing a cyano group.

In some embodiments, based on the weight of the electrolytic solution, the content of the organic compound containing a cyano group is a %, where a is within a range of 0.1 to 10. In some embodiments, a is within a range of 0.1 to 8. In some embodiments, a is within a range of 0.5 to 5. In some embodiments, a is within a range of 1 to 3. In some embodiments, a is 0.1, 0.5, 0.8, 1, 1.5, 2, 2.5, 3, 3.5, 4, 4.5, 5, 5.5, 6, 6.5, 7, 7.5, 8, 8.5, 9, 9.5, or 10, or within a range formed by any two thereof. When the content of the compound containing a cyano group in the electrolytic solution falls within the foregoing ranges, the high-temperature cycle expansion performance and the overcharge protection performance of electrochemical device are further improved.

In some embodiments, the weight per unit area (W mg/cm$^2$) of the negative active material layer and the content (b %) of the compound containing a cyano group in the electrolytic solution satisfy: $0.3 \leq W/a \leq 20$. In some embodiments, $0.5 \leq W/a \leq 15$. In some embodiments, $1 \leq W/a \leq 10$. In some embodiments, $3 \leq W/a \leq 5$. In some embodiments, W/a is 0.3, 0.5, 1, 3, 5, 8, 10, 13, 15, 18, or 20, or within a range formed by any two thereof. When the weight per unit area (W mg/cm$^2$) of the negative active material layer and the content (b %) of the compound containing a cyano group in the electrolytic solution satisfy the foregoing relationships, the high-temperature cycle expansion performance and the overcharge protection performance of the electrochemical device are further improved.

(c) Lithium Difluorophosphate (LiPO$_2$F$_2$)

In some embodiments, based on the weight of the electrolytic solution, a content of the lithium difluorophosphate is within a range of 0.01% to 1.5%. In some embodiments, based on the weight of the electrolytic solution, the content of the lithium difluorophosphate is within a range of 0.05% to 1.2%. In some embodiments, based on the weight of the electrolytic solution, the content of the lithium difluorophosphate is within a range of 0.1% to 1.0%. In some embodiments, based on the weight of the electrolytic solution, the content of the lithium difluorophosphate is within a range of 0.5% to 0.8%. In some embodiments, based on the weight of the electrolytic solution, the content of the lithium difluorophosphate is 0.01%, 0.05%, 0.1%, 0.15%, 0.2%, 0.25%, 0.3%, 0.35%, 0.4%, 0.45%, 0.5%, 0.8%, 1%, or 1.5%, or within a range formed by any two thereof.

(d) Compound Represented by Formula 1

In some embodiments, the compound represented by Formula 1 includes at least one of the following compounds:

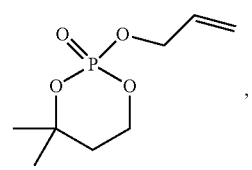

Formula 1-1

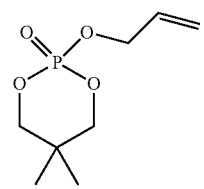

Formula 1-2

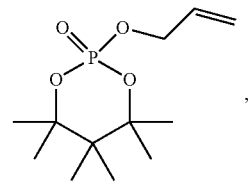

Formula 1-3

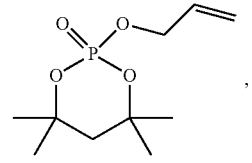

Formula 1-4

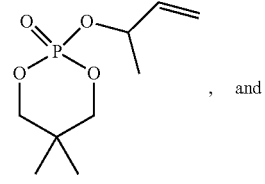

Formula 1-5

, and

Formula 1-6

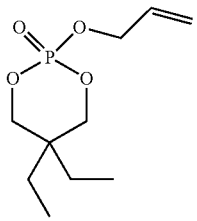

In some embodiments, based on the weight of the electrolytic solution, a content of the compound represented by Formula 1 is within a range of 0.01% to 5%. In some embodiments, based on the weight of the electrolytic solution, the content of the compound represented by Formula 1 is within a range of 0.05% to 3%. In some embodiments, based on the weight of the electrolytic solution, the content of the compound represented by Formula 1 is within a range of 0.1% to 2%. In some embodiments, based on the weight of the electrolytic solution, the content of the compound represented by Formula 1 is within a range of 0.5% to 1%. In some embodiments, based on the weight of the electrolytic solution, the content of the compound represented by Formula 1 is 0.01%, 0.05%, 0.1%, 0.5%, 1%, 2%, 3%, 4%, or 5%, or within a range formed by any two thereof Solvent In some embodiments, the electrolytic solution further includes any nonaqueous solvent known in the prior art for use as a solvent in the electrolytic solution.

In some embodiments, the nonaqueous solvent includes, but is not limited to, one or more of: cyclic carbonate, chain carbonate, cyclic carboxylate, chain carboxylate, cyclic ether, chain ether, a phosphorus-containing organic solvent, a sulfur-containing organic solvent, or an aromatic fluorine-containing solvent.

In some embodiments, examples of the cyclic carbonate may include, but are not limited to, one or more of: ethylene carbonate (EC), propylene carbonate (PC), or butylene carbonate. In some embodiments, the cyclic carbonate contains 3 to 6 carbon atoms.

In some embodiments, examples of the chain carbonate may include, but are not limited to, one or more of: dimethyl carbonate, ethyl methyl carbonate, diethyl carbonate (DEC), methyl n-propyl carbonate, ethyl n-propyl carbonate, di-n-propyl carbonate, or the like. Examples of a fluorinated chain carbonate may include, but are not limited to, one or more of: bis(fluoromethyl)carbonate, bis(difluoromethyl) carbonate, bis(trifluoromethyl)carbonate, bis(2-fluoroethyl) carbonate, bis(2,2-difluoroethyl)carbonate, bis(2,2,2-trifluoroethyl)carbonate, 2-fluoroethyl methyl carbonate, 2,2-difluoroethyl methyl carbonate, 2,2,2-trifluoroethyl methyl carbonate, or the like.

In some embodiments, examples of the cyclic carboxylate may include, but are not limited to, one or more of: γ-butyrolactone and γ-valerolactone. In some embodiments, a part of hydrogen atoms of the cyclic carboxylate may be substituted by fluorine.

In some embodiments, examples of the chain carboxylate may include, but are not limited to, one or more of: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, ethyl pivalate, or the like. In some embodiments, a part of hydrogen atoms of the chain carboxylate may be substituted by fluorine. In some embodiments, examples of a fluorinated chain carboxylate may include, but are not limited to, methyl trifluoroacetate, ethyl trifluoroacetate, propyl trifluoroacetate, butyl trifluoroacetate, 2,2,2-trifluoroethyl trifluoroacetate, or the like.

In some embodiments, examples of the cyclic ether may include, but are not limited to, one or more of: tetrahydrofuran, 2-methyl tetrahydrofuran, 1,3-dioxolane, 2-methyl 1,3-dioxolane, 4-methyl 1,3-dioxolane, 1,3-dioxane, 1,4-dioxane, or dimethoxypropane.

In some embodiments, examples of the chain ether may include, but are not limited to, one or more of: dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, 1,2-ethoxymethoxyethane, or the like.

In some embodiments, examples of the phosphorus-containing organic solvent may include, but are not limited to, one or more of: trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, tris(2,2,3,3, 3-pentafluoropropyl) phosphate, or the like.

In some embodiments, examples of the sulfur-containing organic solvent may include, but are not limited to, one or more of: sulfolane, 2-methyl sulfolane, 3-methyl sulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, or dibutyl sulfate. In some embodiments, a part of hydrogen atoms of the sulfur-containing organic solvent may be substituted by fluorine.

In some embodiments, the aromatic fluorine-containing solvent includes, but is not limited to, one or more of: fluorobenzene, difluorobenzene, trifluorobenzene, tetrafluorobenzene, pentafluorobenzene, hexafluorobenzene, or trifluoromethylbenzene.

In some embodiments, the solvent used in the electrolytic solution according to this application includes cyclic carbonate, chain carbonate, cyclic carboxylate, chain carboxylate, and any combination thereof. In some embodiments, the solvent used in the electrolytic solution according to this application includes an organic solvent selected from groups consisting of any of: ethylene carbonate, propylene carbonate, diethyl carbonate, ethyl propionate, propyl propionate, n-propyl acetate, ethyl acetate, and any combination thereof. In some embodiments, the solvent used in the electrolytic solution according to this application includes: ethylene carbonate, propylene carbonate, diethyl carbonate, ethyl propionate, propyl propionate, γ-butyrolactone, and any combination thereof.

Additives

In some embodiments, examples of the additives may include, but are not limited to, one or more of: fluorocarbonate, ethylene carbonate containing a carbon-carbon double bond, a compound containing a sulfur-oxygen double bond, or acid anhydride.

In some embodiments, based on the weight of the electrolytic solution, the content of the additive is within a range of 0.01% to 15%, a range of 0.1% to 10%, or a range of 1% to 5%.

According to an embodiment of this application, based on the weight of the electrolytic solution, the content of the propionate is 1.5 to 30 times, 1.5 to 20 times, 2 to 20 times, or 5 to 20 times that of the additive.

In some embodiments, the additive includes one or more types of fluorocarbonates. When a lithium-ion battery is charged/discharged, the fluorocarbonate can work together with the propionate to form a stable protection film on a surface of the negative electrode, thereby suppressing decomposition reaction of the electrolytic solution.

In some embodiments, a structural formula of the fluorocarbonate is: $C=O(OR_x)(OR_y)$, where $R_x$ and $R_y$ are each independently a $C_1$ to $C_6$ alkyl or haloalkyl group. At least one of $R_x$ or $R_y$ is a $C_1$ to $C_6$ fluoroalkyl group, and at least one of $R_x$ or $R_y$ combines with an atom connected to it to form a 5- to 7-membered ring.

In some embodiments, examples of the fluorocarbonate may include, but are not limited to, one or more of: fluoroethylene carbonate, cis 4,4-difluoroethylene carbonate, trans 4,4-difluoroethylene carbonate, 4,5-difluoroethylene carbonate, 4-fluoro-4-methyl ethylene carbonate, 4-fluoro-5-methyl ethylene carbonate, trifluoromethyl formate carbonate, trifluoroethyl formate carbonate, ethyl trifluoroacetate carbonate, or the like.

In some embodiments, the additive includes one or more types of ethylene carbonates containing a carbon-carbon double bond. Examples of the ethylene carbonate containing a carbon-carbon double bond may include, but are not limited to, one or more of: vinylene carbonate, methyl vinylene carbonate, ethyl vinylene carbonate, 1,2-dimethylvinylene carbonate, 1,2-diethyl vinylene carbonate, fluorovinylidene carbonate, trifluoromethyl vinylene carbonate, vinyl ethylene carbonate, 1-methyl-2-vinyl ethylene carbonate, 1-ethyl-2-vinyl ethylene carbonate, 1-n-propyl-2-vinyl ethylene carbonate, 1-methyl-2-vinyl ethylene carbonate, 1,1-divinyl ethylene carbonate, 1,2-divinyl ethylene carbonate, 1,1-dimethyl-2-methylene ethylene carbonate, 1,1-diethyl-2-methylene ethylene carbonate, or the like. In some embodiments, the ethylene carbonate containing a carbon-carbon double bond includes vinylene carbonate. The vinylene carbonate is easily available and achieves more excellent effects.

In some embodiments, the additive is a combination of the fluorocarbonate and the ethylene carbonate containing a carbon-carbon double bond. In some embodiments, the additive is a combination of the fluorocarbonate and the compound containing a sulfur-oxygen double bond. In some embodiments, the additive is a combination of the fluorocarbonate and the organic compound containing a cyano group. In some embodiments, the additive is a combination of the fluorocarbonate and cyclic carboxylate. In some embodiments, the additive is a combination of the fluorocarbonate and cyclic phosphoric anhydride. In some embodiments, the additive is a combination of the fluorocarbonate and carboxylic anhydride. In some embodiments, the additive is a combination of the fluorocarbonate and sulfonic anhydride. In some embodiments, the additive is a combination of the fluorocarbonate and carboxylic sulfonic anhydride.

Electrolyte

The electrolyte is not particularly limited, and may be any substance known for use as an electrolyte. In a case of a lithium secondary battery, a lithium salt is generally used as the electrolyte. Examples of the electrolyte may include, but are not limited to, inorganic lithium salts such as $LiPF_6$, $LiBF_4$, $LiClO_4$, $LiAlF_4$, $LiSbF_6$, and $LiWF_7$; lithium tungstate such as $LiWOF_5$, carboxylic lithium salts such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; sulfonic lithium salts such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$; lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, cyclic 1,2-perfluoroethane bissulfonimide lithium, cyclic 1,3-perfluoropropane bissulfonimide lithium, $LiN(CF_3SO_2)(C_4F_9SO_2)$; methylated lithium salts such as $LiC(FSO_2)_3$, $LiC(CF_3SO_2)_3$, and $LiC(C_2F_5SO_2)_3$; (malonate) lithium borate salts such as lithium bis(malonate) borate, and lithium difluoro(malonate) borate; (malonate) lithium phosphate salts such as lithium tris(malonate) phosphate, lithium difluorobis(malonate) phosphate, lithium tetrafluoro(malonate) phosphate; fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$; (oxalate) lithium borate salts such as lithium difluoro(oxalate) borate and lithium bis(oxalate)borate; and (oxalate) lithium phosphate salts such as lithium tetrafluoro(oxalate) phosphate, lithium difluorobis(oxalate) phosphate, lithium tris(oxalate) phosphate, and the like.

In some embodiments, the electrolyte is selected from $LiPF_6$, $LiSbF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, cyclic 1,2-perfluoroethane bissulfonimide lithium, cyclic 1,3-perfluoropropane bissulfonimide lithium, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$, lithium difluoro(oxalato)borate, lithium bis(oxalato)borate, or lithium difluorobis(oxalate) phosphate. Such electrolyte helps to improve the charge-discharge performance, the high-temperature storage performance, and the cycle performance of the electrochemical device.

A content of the electrolyte is not particularly limited as long as effects of this application are not impaired. In some embodiments, a total molar concentration of lithium in the electrolytic solution is greater than 0.3 mol/L, greater than 0.4 mol/L, or greater than 0.5 mol/L. In some embodiments, the total molar concentration of lithium in the electrolytic solution is less than 3 mol/L, less than 2.5 mol/L, or less than 2.0 mol/L. In some embodiments, the total molar concentration of lithium in the electrolytic solution is within a range formed by any two of the foregoing values. When the concentration of the electrolyte is within the foregoing ranges, lithium as charged particles will not be deficient, and a viscosity of the lithium will be in an appropriate range, thereby ensuring a high electrical conductivity easily.

When two or more types of electrolytes are applied, the electrolytes include at least one salt selected from groups consisting of any of monofluorophosphate, borate, oxalate, or fluorosulfonate. In some embodiments, the electrolytes include a salt selected from groups consisting of any of monofluorophosphate, oxalate, or fluorosulfonate. In some embodiments, the electrolyte includes a lithium salt. In some embodiments, based on a weight of the electrolyte, a content of the salt selected from the groups consisting of any of monofluorophosphate, borate, oxalate, or fluorosulfonate is greater than 0.01% or greater than 0.1%. In some embodiments, based on the weight of the electrolyte, the content of the salt selected from the groups consisting of any of monofluorophosphate, borate, oxalate, or fluorosulfonate is less than 20% or less than 10%. In some embodiments, the content of the salt selected from the groups consisting of any of monofluorophosphate, borate, oxalate, or fluorosulfonate is within a range formed by any two of the foregoing values.

In some embodiments, the electrolyte contains at least one substance selected from groups consisting of any of monofluorophosphate, borate, oxalate, or fluorosulfonate, and a least one type of salt other than the substance. The salt other than the substance may be a salt exemplified above. In some embodiments, the salt other than the substance is $LiPF_6$, $LiN(FSO_2)(CF_3SO_2)$, $LiN(CF_3SO_2)_2$, $LiN(C_2F_5SO_2)_2$, cyclic 1,2-perfluoroethane bissulfonimide lithium, cyclic 1,3-perfluoropropane bissulfonimide lithium, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, or $LiPF_3(C_2F_5)_3$. In some embodiments, the salt other than the substance is $LiPF_6$.

In some embodiments, based on the weight of the electrolyte, a content of the salt other than the substance is greater than 0.01% or greater than 0.1%. In some embodiments, based on the weight of the electrolyte, the content of the salt other than the substance is less than 20%, less than 15%, or less than 10%. In some embodiments, the content of the salt other than the substance is within a range formed by any two of the foregoing values. The salt other than the substance, whose content falls within the foregoing ranges, helps to balance the conductivity and viscosity of the electrolytic solution.

The electrolytic solution not only contains the foregoing solvent, additive, and electrolyte salt, but may also contain additional additives such as a negative electrode film-forming agent, a positive electrode protection agent, and an overcharge prevention agent as appropriate. The additives are additives that are generally used in a secondary battery containing a nonaqueous electrolyte. Examples of the additives may include, but are not limited to, vinylene carbonate, succinic anhydride, biphenyl, cyclohexylbenzene, 2,4-difluorobenzyl ether, propane sultone, propene sultone, and the like. Such additives may be used alone or combined arbitrarily. In addition, the content of the additives in the electrolytic solution is not particularly limited, and may be appropriately configured according to factors such as the type of the additive. In some embodiments, based on the weight of the electrolytic solution, the content of the additive is less than 5%, within a range of 0.01% to 5%, or within a range of 0.2% to 5%.

III. Positive Electrode

The positive electrode includes a positive current collector and a positive active material layer disposed on one or both surfaces of the positive current collector.

1. Positive Active Material Layer

The positive active material layer contains a positive active material. The positive active material layer may be a single layer or a plurality of layers. Each layer in the multilayer positive active material layer may contain the same or a different positive active material. The positive active material is any substance capable of reversibly intercalating and deintercalating metal ions such as lithium ions.

The type of the positive active material is not particularly limited, as long as the material can electrochemically uptake and release metal ions (such as lithium ions). In some embodiments, the positive active material is a substance containing lithium and greater than or equal to one transition metal. Examples of the positive active material may include, but are not limited to, a lithium transition metal composite oxide, and a lithium-containing transition metal phosphate compound.

In some embodiments, transition metals in the lithium transition metal composite oxide include V, Ti, Cr, Mn, Fe, Co, Ni, Cu, and the like. In some embodiments, the lithium transition metal composite oxide includes a lithium cobalt composite oxide such as $LiCoO_2$; a lithium nickel composite oxide such as $LiNiO_2$; a lithium manganese composite oxide such as $LiMnO_2$, $LiMn_2O_4$, and $Li_2MnO_4$; a lithium nickel manganese cobalt composite oxide such as $LiNi_{1/3}Mn_{1/3}Co_{1/3}O_2$ and $LiNi_{0.5}Mn_{0.3}Co_{0.2}O_2$, where a part of transition metal atoms serving as a main body of the lithium transition metal composite oxide are substituted by other elements such as Na, K, B, F, Al, Ti, V, Cr, Mn, Fe, Co, Li, Ni, Cu, Zn, Mg, Ga, Zr, Si, Nb, Mo, Sn, and W. Examples of the lithium transition metal composite oxide may include, but are not limited to, $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$, $LiMn_{1.5}Ni_{0.5}O_4$, and the like. Examples of combinations of the lithium transition metal composite oxides include, but are not limited to, a combination of $LiCoO_2$ and $LiMn_2O_4$, where a part of Mn in $LiMn_2O_4$ may be substituted by a transition metal (such as $LiNi_{0.33}Co_{0.33}Mn_{0.33}O_2$), and a part of Co in $LiCoO_2$ may be substituted by a transition metal.

In some embodiments, the transition metals in the lithium-containing transition metal phosphate compound include V, Ti, Cr, Mn, Fe, Co, Ni, Cu, and the like. In some embodiments, the lithium-containing transition metal phosphate compounds include iron phosphate such as $LiFePO_4$, $Li_3Fe_2(PO_4)_3$, and $LiFeP_2O_7$; and cobalt phosphate such as $LiCoPO_4$, where a part of transition metal atoms serving as a main body of the lithium transition metal phosphate compounds are substituted by other elements such as Al, Ti, V, Cr, Mn, Fe, Co, Li, Ni, Cu, Zn, Mg, Ga, Zr, Nb, Si, and the like.

In some embodiments, the positive active material includes lithium phosphate, which can improve continuous charging performance of the electrochemical device. The use of the lithium phosphate is not limited. In some embodiments, the positive active material is mixed with the lithium phosphate. In some embodiments, in relation to a weight of the positive active material and the lithium phosphate, a content of the lithium phosphate is greater than 0.1%, greater than 0.3%, or greater than 0.5%. In some embodiments, in relation to the weight of the positive active material and the lithium phosphate, the content of the lithium phosphate is less than 10%, less than 8%, or less than 5%. In some embodiments, the content of the lithium phosphate is within a range formed by any two of the foregoing values.

Surface Coating

A substance different from the composition of the positive active material may be attached to a surface of the positive active material. Examples of substances attached to the surface may include, but are not limited to: oxides such as aluminum oxide, silicon dioxide, titanium dioxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, calcium carbonate, and magnesium carbonate; carbon; and the like.

Such a substance attached to the surface may be attached to the surface of the positive active material by: (i) dissolving or suspending the substance in a solvent, letting the substance be added and infiltrate the positive active material, and drying; (ii) dissolving or suspending a precursor of the substance in a solvent, letting the substance be added and infiltrate the positive active material, and letting the substance react by means of heating or by other means; or (iii) adding the substance into a precursor of the positive active material, and sintering the substance concurrently; or the like. In a case that carbon is attached to the surface, the attachment may also be implemented by mechanically attaching a carbon material (such as activated carbon) to the surface.

In some embodiments, based on the weight of the positive active material layer, a content of the substance attached to the surface is greater than 0.1 ppm, greater than 1 ppm, or greater than 10 ppm. In some embodiments, based on the weight of the positive active material layer, the content of the substance attached to the surface is less than 10%, less than 5%, or less than 2%. In some embodiments, based on the weight of the positive active material layer, the content of the substance attached to the surface is within a range formed by any two of the foregoing values.

The attachment of the substance onto the surface of the positive active material can suppress oxidation reactions of the electrolytic solution on the surface of the positive active material, and increase the life of the electrochemical device. When the amount of the substance attached to the surface is too small, the effect of the substance is not fully exhibited. When the amount of the substance attached to the surface is too large, the substance will hinder movement of lithium ions, and thereby sometimes increase an electrical resistance.

In this application, the substance whose composition is different from that of the positive active material, which is attached onto the surface of the positive active material, is also referred to as a "positive active substance".

Shapes

In some embodiments, shapes of particles of the positive active material include, but are not limited to, a block shape, a polyhedron shape, a spherical shape, an elliptical spherical shape, a plate shape, a needle shape, a column shape, and the like. In some embodiments, the particles of the positive active material include primary particles, secondary particles, or a combination thereof. In some embodiments, the primary particles may coalesce into the secondary particles.

Tap Density

In some embodiments, the tap density of the positive active material is greater than 0.5 g/cm$^3$, greater than 0.8 g/cm$^3$, or greater than 1.0 g/cm$^3$. When the tap density of the positive active material falls within the foregoing ranges, the amount of a dispersion medium required for formation of the positive active material layer, the required amount of the conductive material, and the required amount of the positive binder can be reduced, thereby ensuring a high packability of the positive active material and a high capacity of the electrochemical device. A composite oxide powder with a high tap density can be used to form a high-density positive active material layer. Generally, the higher the tap density, the better, without being limited to a particular upper limit. In some embodiments, the tap density of the positive active material is less than 4.0 g/cm$^3$, less than 3.7 g/cm$^3$, or less than 3.5 g/cm$^3$. When the tap density of the positive active material falls within the foregoing upper limit, deterioration of load characteristics can be suppressed.

The tap density of the positive active material may be determined by: putting 5 to 10 grams of the positive active material powder into a 10 mL glass graduated cylinder, and tapping the powder along a 20 mm stroke for 200 times to obtain a powder packing density (tap density).

Median Diameter (D50)

When the particles of the positive active material are primary particles, a median diameter (D50) of the particles of the positive active material means a primary particle diameter of the particles of the positive active material. When the primary particles of the positive active material coalesce into secondary particles, the median diameter (D50) of the particles of the positive active material means a secondary particle diameter of the particles of the positive active material.

In some embodiments, the median diameter (D50) of the particles of the positive active material is greater than 0.3 μm, greater than 0.5 μm, greater than 0.8 μm, or greater than 1.0 μm. In some embodiments, the median diameter (D50) of the particles of the positive active material is less than 30 μm, less than 27 μm, less than 25 μm, or less than 22 μm. In some embodiments, the median diameter (D50) of the particles of the positive active material is within a range formed by any two of the foregoing values. When the median diameter (D50) of the particles of the positive active material falls within the foregoing ranges, a positive active material of a high tap density can be obtained, and performance degradation of the electrochemical device can be suppressed. In addition, other problems such as occurrence of streaks can be prevented in a process of preparing the positive electrode of the electrochemical device (the preparation process includes: mixing the positive active material, the conductive material, the binder, and the like with a solvent to form a slurry, and applying the slurry as a thin-film coating). In this way, packability of the positive active material during preparation of the positive electrode can be further increased by mixing of two or more types of positive active materials of different median diameters.

The median diameter (D50) of the particles of the positive active material can be measured with a laser diffraction/scattering particle size distribution analyzer. An exemplary measurement method includes: using a HORIBA LA-920 instrument as a particle size distribution analyzer, using a sodium hexametaphosphate aqueous solution of a 0.1% concentration as a dispersion medium for the measurement, ultrasonically dispersing the dispersion medium for 5 minutes, and then setting a measurement refractive index to 1.24 to determine the median diameter.

Average Primary Particle Diameter

In the case that the primary particles of the positive active material coalesce into secondary particles, in some embodiments, the average primary particle diameter of the positive active material is greater than 0.05 μm, greater than 0.1 or greater than 0.5 In some embodiments, the average primary particle diameter of the positive active material is less than 5 μm, less than 4 μm, less than 3 μm, or less than 2 μm. In some embodiments, the average primary particle diameter of the positive active material is within a range formed by any two of the foregoing values. When the average primary particle diameter of the positive active material falls within the foregoing ranges, a high packability of the powder and a high specific surface area of the positive active material are ensured, the performance deterioration of the battery can be suppressed, and an appropriate crystallinity can be obtained, thereby ensuring reversibility of the charge-discharge reaction of the electrochemical device.

The average primary particle diameter of the positive active material may be determined by observation of a scanning electron microscope (SEM) image. An exemplary determining method includes: in an SEM image with a 10000× scale, making a slice of any 50 primary particles arranged linearly in a horizontal direction, measuring a longest distance from a left boundary line of the slice to a right boundary line, and dividing the measured distance by the number of particles to obtain the average primary particle diameter.

Specific Surface Area (BET)

In some embodiments, a specific surface area (BET) of the positive active material is greater than 0.1 m$^2$/g, greater than 0.2 m²/g, or greater than 0.3 m²/g. In some embodiments, the specific surface area (BET) of the positive active material is less than 50 m²/g, less than 40 m²/g, or less than 30 m²/g. In some embodiments, the specific surface area (BET) of the positive active material is within a range formed by any two of the foregoing values. When the specific surface area (BET) of the positive active material falls within the foregoing ranges, high performance of the electrochemical device can be ensured, and it is very convenient to apply the positive active material as a coating.

The specific surface area (BET) of the positive active material may be measured by the following method: using a surface area meter (for example, an automatic surface area measurement device manufactured by Ohkura Riken) as an measurement instrument, pre-drying a sample at 150° C. for 30 minutes under a nitrogen flux, and then accurately adjusting a relative pressure of nitrogen in a nitrogen-helium mixture in relation to an atmospheric pressure to 0.3, and measuring the specific surface area by using a single-point Brunauer-Emmett-Teller (BET) nitrogen adsorption method based on a gas flow technique.

Positive Conductive Material

The positive conductive material is not limited in type, and may be any known conductive material. Examples of the positive conductive material may include, but are not limited to, graphite such as natural graphite and artificial graphite; carbon black such as acetylene black; carbon materials such as amorphous carbon (for example, needle coke); carbon nanotubes; graphene, and the like. The foregoing positive conductive materials may be used alone or combined arbitrarily.

In some embodiments, based on the weight of the positive active material layer, a content of the positive conductive material is greater than 0.01%, greater than 0.1%, or greater than 1%. In some embodiments, based on the weight of the positive active material layer, the content of the positive conductive material is less than 10%, less than 8%, or less than 5%. When the content of the positive conductive material falls within the foregoing ranges, a sufficient conductivity of the conductive material and a high capacity of the electrochemical device can be ensured.

Positive Binder

The positive binder used in manufacturing the positive active material layer is not particularly limited in type. In a case that the binder is applied in a coating manner, any binder material may be used as the positive binder as long as the material is soluble or dispersible in a liquid medium when being used in preparing an electrode. Examples of the positive binder may include, but are not limited to, one or more of: resin polymers such as polyethylene, polypropylene, polyethylene terephthalate, polymethyl methacrylate, polyimide, aramid, cellulose, and nitrocellulose; rubber polymers such as styrene butadiene rubber (SBR), nitrile butadiene rubber (NBR), fluorine rubber, isoprene rubber, polybutadiene rubber, and ethylene-propylene rubber; thermoplastic elastomer polymers such as a styrene-butadiene-styrene block copolymer or a hydrogenated product thereof, an ethylene-propylene-diene terpolymer (EPDM), a styrene-ethylene-butadiene-ethylene copolymer, a styrene-isoprene-styrene block copolymer or a hydrogenated product thereof; soft resinous polymers such as syndiotactic-1,2-polybutadiene, polyvinyl acetate, an ethylene-vinyl acetate copolymer, a propylene-α-olefin copolymer; fluorine-based polymers such as polyvinylidene difluoride (PVDF), polytetrafluoroethylene, fluorinated polyvinylidene difluoride, and a polytetrafluoroethylene-ethylene copolymer; and ion-conductive polymer composites containing alkali metal ions (especially lithium ions). The foregoing positive binders may be used alone or combined arbitrarily.

In some embodiments, based on the weight of the positive active material layer, a content of the positive binder is greater than 0.1%, greater than 1%, or greater than 1.5%. In some embodiments, based on the weight of the positive active material layer, the content of the positive binder is less than 10%, less than 5%, less than 4%, or less than 3%. When the content of the positive binder falls within the foregoing ranges, the positive electrode achieves a high conductivity and sufficient mechanical strength, and a high capacity of the electrochemical device is ensured.

Solvent

The solvent used to form a positive slurry is not limited in type, and any solvent is appropriate as long as it can dissolve or disperse the positive active material, the conductive material, the positive binder, and a thickener used as needed. Examples of the solvent used to form the positive slurry may include any one of an aqueous solvent or an organic solvent. Examples of the aqueous medium solvent may include, but are not limited to, water, and a mixed medium of alcohol and water, and the like. Examples of the organic media solvent include, but are not limited to, aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylene triamine, and N,N-dimethylaminopropylamine; ethers such as diethyl ether, propylene oxide, and tetrahydrofuran (THF); amides such as N-methyl-pyrrolidone (NMP), dimethylformamide, and dimethylacetamide; and aprotic polar solvents such as hexamethylphosphoramide, and dimethylsulfoxide.

Thickener

A thickener is usually used to adjust viscosity of a slurry. In a case that an aqueous medium is used, a thickener and a styrene butadiene rubber (SBR) emulsion may be added to make a slurry. The thickener is not particularly limited in type. Examples of the thickener may include, but are not limited to, carboxymethyl cellulose, methyl cellulose, hydroxymethyl cellulose, ethyl cellulose, polyvinyl alcohol, oxidized starch, phosphorylated starch, casein, and a salt thereof, and the like. The foregoing thickeners may be used alone or combined arbitrarily.

In some embodiments, based on the weight of the positive active material layer, a content of the thickener is greater than 0.1%, greater than 0.2%, or greater than 0.3%. In some embodiments, based on the weight of the positive active material layer, the content of the thickener is less than 5%, less than 3%, or less than 2%. In some embodiments, based on the weight of the positive active material layer, the content of the thickener is within a range formed by any two of the foregoing values. When the content of the thickener falls within the foregoing ranges, the positive slurry is well suitable for coating, and capacity attenuation and resistance increase of the electrochemical device can be suppressed.

Content of the Positive Active Material

In some embodiments, based on the weight of the positive active material layer, a content of the positive active material is greater than 80%, greater than 82%, or greater than 84%. In some embodiments, based on the weight of the positive active material layer, the content of the positive active material is less than 99% or less than 98%. In some embodiments, based on the weight of the positive active material layer, the content of the positive active material is within a range formed by any two of the foregoing values.

When the content of the positive active material falls within the foregoing ranges, a high capacitance of the positive active material in the positive active material layer can be ensured while the strength of the positive electrode is maintained.

Density of the Positive Active Material Layer

In a case that the positive active material layer is obtained by coating and drying, in order to increase a packing density of the positive active material, the positive active material layer may be compacted by using a manual press machine or a calendering machine. In some embodiments, a density of the positive active material layer is greater than 1.5 g/cm$^3$, greater than 2 g/cm$^3$, or greater than 2.2 g/cm$^3$. In some embodiments, the density of the positive active material layer is less than 5 g/cm$^3$, less than 4.5 g/cm$^3$, or less than 4 g/cm$^3$. In some embodiments, the density of the positive active material layer is within a range formed by any two of the foregoing values. When the density of the positive active material layer falls within the foregoing ranges, the electrochemical device achieves high charge and discharge performance, and resistance increase is suppressed.

Thickness of the Positive Active Material Layer

The thickness of the positive active material layer means a thickness of the positive active material layer on either side of the positive current collector. In some embodiments, the thickness of the positive active material layer is greater than 10 μm or greater than 20 μm. In some embodiments, the thickness of the positive active material layer is less than 500 μm or less than 450 μm.

Method for Preparing the Positive Active Material

The positive active material may be prepared using a typical preparation method of an inorganic compound. To make a spherical or ellipsoidal positive active material, the preparation method may include: dissolving or pulverizing ingredients of transition metal, and dispersing the ingredients in a solvent such as water; adjusting a pH value while stirring to make a spherical precursor, taking the precursor back, drying the precursor as needed, adding a Li source such as LiOH, $Li_2CO_3$, $LiNO_3$, and sintering at a high temperature to obtain a positive active material.

2. Positive Current Collector

The positive current collector is not particularly limited in type, and may be made of any material known as suitable for use in a positive current collector. Examples of the positive current collector may include, but are not limited to, metal materials such as aluminum, stainless steel, nickel plating, titanium, and tantalum; and carbon materials such as carbon cloth and carbon paper. In some embodiments, the positive current collector is made of a metal material. In some embodiments, the positive current collector is made of aluminum.

The form of the positive current collector is not particularly limited. When the positive current collector is made of a metal material, the form of the positive current collector includes, but is not limited to, a metal foil, a metal cylinder, a metal coil, a metal sheet, a metal film, a metal mesh, stamped metal, foamed metal, and the like. When the positive current collector is made of a carbon material, the form of the positive current collector may include, but is not limited to, a carbon plate, a carbon film, a carbon cylinder, and the like. In some embodiments, the positive current collector is a metal foil. In some embodiments, the metal foil is meshed. A thickness of the metal foil is not particularly limited. In some embodiments, the thickness of the metal foil is greater than 1 μm, greater than 3 μm, or greater than 5 μm. In some embodiments, the thickness of the metal foil is less than 1 mm, less than 100 μm, or less than 50 μm. In some embodiments, the thickness of the metal foil is within a range formed by any two of the foregoing values.

To reduce an electronic contact resistance of the positive current collector and the positive active material layer, a conductive agent may be contained on a surface of the positive current collector. Examples of the conductive agent may include, but are not limited to, carbon and noble metals such as gold, platinum, and silver.

A thickness ratio of the positive active material layer to the positive current collector means a result of dividing the thickness of the positive active material layer on a single side of the positive current collector by the thickness of the positive current collector. The value of the thickness ratio is not particularly limited. In some embodiments, the thickness ratio is less than 50, less than 30, or less than 20. In some embodiments, the thickness ratio is greater than 0.5, greater than 0.8, or greater than 1. In some embodiments, the thickness ratio is within a range formed by any two of the foregoing values. When the thickness ratio falls within the foregoing ranges, heat emission of the positive current collector can be suppressed when charge or discharge is performed at a high current density, and a high capacity of the electrochemical device can be ensured.

3. Method for Preparing a Positive Electrode

A positive electrode may be prepared by forming a positive active material layer on a current collector, where the positive active material layer contains a positive active material and a binder. The positive electrode that contains a positive active material may be prepared by a conventional method. To be specific, the method may include: dry-mixing a positive active material, a binder, and, as appropriate, a conductive material and a thickener and the like, so as to form a sheet; and crimping the obtained sheet onto the positive current collector; or dissolving or dispersing such materials into a liquid medium to form a slurry, coating the positive current collector with the slurry, and drying to form a positive active material layer on the current collector, thereby obtaining a positive electrode.

IV. Separator

To prevent short circuits, a separator is generally disposed between the positive electrode and the negative electrode. In this case, the electrolytic solution according to this application generally works by infiltrating the separator.

The material and shape of the separator are not particularly limited as long as they do not significantly impair the effects of this application. The material of the separator may be resin, glass fiber, an inorganic compound, or the like that is stable to the electrolytic solution according to this application. In some embodiments, the separator contains a highly liquid-retaining porous sheet or non-woven fabric shaped substance, and the like. Examples of resin or glass fiber used as the separator may include, but are not limited to, polyolefin, aramid, polytetrafluoroethylene, polyethersulfone, and the like. In some embodiments, the polyolefin is polyethylene or polypropylene. In some embodiments, the polyolefin is polypropylene. The foregoing separator materials may be used alone or combined arbitrarily.

The separator may also be made of a material that is formed by stacking the foregoing materials. Examples of such material include, but are not limited to, a three-layer separator formed by sequentially stacking polypropylene, polyethylene, and polypropylene.

Examples of the inorganic compound used as the material of the separator may include, but are not limited to, an oxide such as aluminum oxide and silicon dioxide; a nitride such as aluminum nitride and silicon nitride; and a sulfate salt (such as barium sulfate and calcium sulfate). The shape of the inorganic compound may include, but is not limited to a particle or fiber shape.

The form of the separator may be a thin film form. Examples include, but are not limited to, a non-woven fabric, a woven fabric, a microporous film, and the like. In a case that the separator is in a thin film form, a pore size of the separator is 0.01 μm to 1 μm, and a thickness of the separator is 5 μm to 50 μm. Other than the stand-alone separator described above, a separator made in the following way is also applicable: a separator made by forming a composite porous layer on the surface of the positive electrode and/or the negative electrode by using a resinous binder, where the composite porous layer contains the foregoing inorganic particles. For example, the separator is made by using a fluororesin as a binder so that aluminum oxide particles with a volume median diameter Dv90 less than 1 μm form a porous layer on both sides of the positive electrode.

The thickness of the separator is arbitrary. In some embodiments, the thickness of the separator is greater than 1 μm, greater than 5 μm, or greater than 8 μm. In some embodiments, the thickness of the separator is less than 50 μm, less than 40 μm, or less than 30 μm. In some embodiments, the thickness of the separator is within a range formed by any two of the foregoing values. When the thickness of the separator falls within the foregoing ranges, high insulation and mechanical strength of the separator are ensured, and high rate performance and energy density of the electrochemical device are ensured.

When a porous material such as a porous sheet or non-woven fabric is used as the separator, a porosity of the separator is arbitrary. In some embodiments, the porosity of the separator is greater than 10%, greater than 15%, or greater than 20%. In some embodiments, the porosity of the separator is less than 60%, less than 50%, or less than 45%. In some embodiments, the porosity of the separator is within a range formed by any two of the foregoing values. When the porosity of the separator falls within the foregoing ranges, high insulation and mechanical strength of the separator are ensured, a separator resistance can be suppressed, and high safety performance of the electrochemical device is ensured.

An average pore size of the separator is also arbitrary. In some embodiments, the average pore size of the separator is less than 0.5 μm or less than 0.2 μm. In some embodiments, the average pore size of the separator is greater than 0.05 μm. In some embodiments, the average pore size of the separator is within a range formed by any two of the foregoing values. If the average pore size of the separator exceeds the foregoing ranges, a short circuit is likely to occur. When the average pore size of the separator falls within the foregoing ranges, high safety performance of the electrochemical device is ensured.

V. Components of the Electrochemical Device

Components of the electrochemical device include an electrode assembly, a current collection structure, an outer housing, and a protection element.

Electrode Assembly

The electrode assembly may be a stacked structure formed by stacking the positive electrode and the negative electrode that are interspaced with the separator, or a jelly-roll structure formed by spirally winding the positive electrode and the negative electrode that are interspaced with the separator. In some embodiments, a percentage of a volume of the electrode assembly in a total volume inside a battery (hereinafter referred to as "electrode assembly volume percent") is greater than 40% or greater than 50%. In some embodiments, the electrode assembly volume percent is less than 90% or less than 80%. In some embodiments, the electrode assembly volume percent is within a range formed by any two of the foregoing values. When the electrode assembly volume percent falls within the foregoing range, a high capacity of the electrochemical device is ensured, and deterioration of performance such as charge and discharge cycle performance and high-temperature storage performance is suppressed, where the deterioration of performance is accompanied with an increase of an internal pressure.

Current Collection Structure

The current collection structure is not particularly limited. In some embodiments, the current collection structure is a structure that reduces a resistance of a wiring part and a splicing part. When the electrode assembly is the foregoing stacked structure, it is appropriate to use a structure formed by bundling a metal core part of each electrode layer and welding the bundle to a terminal. When an area of an electrode plate increases, an internal resistance increases. Therefore, it is appropriate to configure greater than or equal to 2 terminals in the electrode to reduce the resistance. When the electrode assembly is the jelly-roll structure, greater than or equal to 2 wiring structures are disposed on the positive electrode and the negative electrode separately and are bundled on the terminals, thereby reducing the internal resistance.

Outer Housing

The material of the outer housing is not particularly limited as long as the material is stable to the electrolytic solution in use. The material of the outer housing may be, but is not limited to, a metallic material such as nickel-plated steel, stainless steel, aluminum, aluminum alloy, magnesium alloy, or a laminated film of resin and an aluminum foil. In some embodiments, the outer housing is a metal or laminated film of aluminum or aluminum alloy.

The metallic outer housing includes, but is not limited to, a sealed airtight structure formed by fusing metals to each other by means of laser welding, resistance welding, or ultrasonic welding; or the metallic outer housing is a riveted structure formed by using such metals cushioned by a resin gasket. The outer housing made of the laminated film includes, but is not limited to, a sealed airtight structure formed by thermally bonding resin layers. To increase airtightness, the resin layers may be interspaced with a resin different from the resin used in the laminated film. When the airtight structure is formed by thermally bonding the resin layers through a current collection terminal, in view of the bonding between the metal and the resin, the resin between the resin layers may be a resin that contains a polar group or a modified resin into which a polar group is introduced. In addition, the shape of the outer housing is also arbitrary. For example, the outer housing may be any of the shapes such as a cylindrical shape, a square shape, a laminated shape, a button shape, and a bulk shape.

Protection Element

The protection element may be a positive temperature coefficient (PTC) thermistor, a temperature fuse, or a thermistor, which, in each case, increases a resistance when abnormal heat is emitted or an excessive current is passed; or may be a valve (a current cutoff valve) that cuts off the current in a circuit by rapidly increasing the internal pressure or internal temperature of the battery during abnormal heat emission, or the like. The protection element may be an element that remains idle during routine use under a high current, and may also be designed in a form that prevents abnormal heat radiation or thermal runaway even if no protection element exists.

VI. Applicability

The electrochemical device according to this application includes any device in which an electrochemical reaction occurs. Specific examples of the electrochemical device include all kinds of primary batteries, secondary batteries, fuel batteries, solar batteries, or capacitors. In particular, the electrochemical device is a lithium secondary battery, including a lithium metal secondary battery or a lithium-ion secondary battery.

Another aspect of this application provides an electronic device, including the electrochemical device according to this application.

The uses of the electrochemical device according to this application are not particularly limited, and the electrochemical device may be used in any electronic device known in the prior art. In some embodiments, the electrochemical device according to this application is applicable to, but without limitation: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes preparation of a lithium-ion battery as an example with reference to specific embodiments. A person skilled in the art understands that the preparation method described in this application are merely examples. Any other appropriate preparation methods fall within the scope of this application.

EMBODIMENTS

The following describes performance evaluation of the lithium-ion batteries according to the embodiments and comparative embodiments of this application.

I. Preparing a Lithium-Ion Battery

1. Preparing a Negative Electrode

A preparation method includes: mixing a conductive material and a binder (when the conductive material exists, a mass ratio of the conductive material to the binder is 64.5%:35.5%) with deionized water according to the formulas specified in the comparative embodiments and the embodiments, and stirring evenly to obtain a first slurry; coating a copper foil with the first slurry.

The preparation method further includes: taking artificial graphite, styrene butadiene rubber, and sodium carboxymethyl cellulose at a mass ratio of 96%:2%:2%, and mixing them with deionized water, and then stirring evenly to form a second slurry; coating the second slurry onto the copper foil already coated with the first slurry; and performing drying, cold calendering, cutting, and tab welding to obtain a negative electrode.

2. Preparing a Positive Electrode

A preparation method includes: taking lithium cobaltate ($LiCoO_2$), a conductive material (Super-P), and polyvinylidene difluoride (PVDF) at a mass ratio of 95%:2%:3%, mixing them with N-methyl-pyrrolidone (NMP), and stirring evenly to obtain a positive slurry; coating an aluminum foil of 12 μm in thickness with the positive slurry, and performing drying, cold calendering, cutting, and tab welding to obtain a positive electrode.

3. Preparing an Electrolytic Solution

A preparation method includes: mixing ethylene carbonate (EC), propylene carbonate (PC), and diethyl carbonate (DEC) (at a weight ratio of 1:1:1) in a dry argon atmosphere, and adding $LiPF_6$ and stirring evenly to form a base electrolytic solution, where a concentration of $LiPF_6$ is 1.15 mol/L; and adding additives of different dosages into the base electrolytic solution to obtain the electrolytic solution specified in different embodiments and comparative embodiments.

The abbreviations and full names of ingredients in the electrolytic solution are shown in the following table:

| Material name | Abbreviation | Material name | Abbreviation |
|---|---|---|---|
| Ethylene carbonate | EC | Propylene carbonate | PC |
| Ethyl methyl carbonate | EMC | Ethyl propionate | EP |
| Propyl propionate | PP | Adiponitrile | ADN |
| Succinonitrile | SN | 1,3,6-hexanetricarbonitrile | HTCN |
| Ethylene glycol bis(2-cyanoethyl) ether | EDN | Lithium difluorophosphate | $LiPO_2F_2$ |
| 1,2,3-tris(2-cyanoethoxy) propane | TCEP | 1,2-ethylene glycol sulfate | DTD |
| 1,3-propane sultone | PS | Compound represented by Formula 1-2 | Formula 1-2 |
| Compound represented by Formula 1-1 | Formula 1-1 | | |

4. Preparing a Separator

A polyethylene (PE) porous polymer film serves as a separator.

5. Preparing a Lithium-Ion Battery

A preparation method includes: sequentially winding the obtained positive electrode, separator, and negative electrode, putting them into an outer package foil, and leaving an injection hole; injecting the electrolytic solution from the injection hole, and performing packaging, chemical formation, capacity grading, and the like to make a lithium-ion battery.

II. Test Methods

1. Method for Determining a Cycle Expansion Rate of the Lithium-Ion Battery

The determining method includes: leaving the lithium-ion battery to stand for 30 minutes at a temperature of 55° C., charging the battery at a constant current of 0.5 C-rate until the voltage reaches 4.45 V, charging the battery at a constant voltage of 4.45 V until the current reaches 0.05 C, leaving the battery to stand for 5 minutes, and measuring a thickness of the lithium-ion battery; repeating the foregoing process for 100 cycles under the foregoing conditions, and measuring the thickness of the lithium-ion battery after the cycles; calculating a high-temperature cycle expansion rate of the lithium-ion battery according to the following formula:

high-temperature cycle expansion rate=[(thickness after the cycles−thickness before the cycles)/ thickness before the cycles]×100%.

2. Method for Determining an Overcharge Deformation Rate of the Lithium-Ion Battery The determining method includes: leaving the lithium-ion battery to stand for 30 minutes at a temperature of 25° C., charging the battery at a constant current of 0.5 C-rate until the voltage reaches 4.45 V, charging the battery at a constant voltage of 4.45 V until the current reaches 0.05 C, leaving the battery to stand for 60 minutes, and measuring a thickness T1 of the lithium-ion battery; and charging the battery at a constant current of 0.1 C-rate for 60 minutes and leaving the battery to stand for 30 minutes; repeating this process for 5 times so that a state of charge (SOC) of the lithium-ion battery reaches 150%; and measuring the thickness T2 of the lithium-ion battery:

overcharge deformation rate=$[(T2-T1)/T1]\times 100\%$.

III. Test Results

Table 1 shows how the conductive material and the weight (W mg/cm$^2$) of the negative active material layer affect the high-temperature cycle expansion rate and the overcharge deformation rate of the lithium-ion battery. In the comparative embodiments and embodiments listed in Table 1, D50 of the negative active material is 15 μm, and styrene-butadiene rubber (SBR) is used as a binder.

TABLE 1

|  | Conductive material | | W (mg/cm$^2$) | High-temperature cycle expansion rate | Overcharge deformation rate |
| --- | --- | --- | --- | --- | --- |
|  | Type | Average particle diameter (μm) |  |  |  |
| Comparative Embodiment 1-1 | / | / | 2 | 22.3% | 24.6% |
| Comparative Embodiment 1-2 | / | / | 4 | 21.5% | 28.3% |
| Comparative Embodiment 1-3 | / | / | 15 | 25.7% | 22.1% |
| Comparative Embodiment 1-4 | Carbon black | 1 | 2 | 20.9% | 23.5% |
| Comparative Embodiment 1-5 | Carbon black | 1 | 15 | 23.6% | 21.5% |
| Embodiment 1-1 | Carbon black | 0.8 | 4 | 12.2% | 10.1% |
| Embodiment 1-2 | Carbon black | 0.8 | 7 | 7.5% | 8.1% |
| Embodiment 1-3 | Carbon black | 1 | 12 | 7.9% | 8.8% |
| Embodiment 1-4 | Carbon fiber | 0.8 | 3 | 6.7% | 7.5% |
| Embodiment 1-5 | Carbon fiber | 0.8 | 7 | 6.2% | 7.3% |
| Embodiment 1-6 | CNT | 0.8 | 3 | 5.3% | 6.9% |
| Embodiment 1-7 | CNT | 0.8 | 7 | 5.7% | 6.3% |
| Embodiment 1-8 | Carbon black | 1.5 | 12 | 14.7% | 15.9% |

"/" means that the substance is not added or this feature is not applicable.

The test results show that the high-temperature cycle expansion rate and the overcharge deformation rate of the lithium-ion battery can be significantly reduced when: (i) a conductive material exists between the negative active material layer and the negative current collector; (ii) the average particle diameter of the conductive material is smaller than the average particle diameter of the negative active material; and (iii) the weight per unit area of the negative active material layer is in a range of 3 mg/cm$^2$ to 12 mg/cm$^2$. On this basis, when the average particle diameter of the conductive material is 1 μm or less, the high-temperature cycle expansion rate and the overcharge deformation rate of the lithium-ion battery can be further reduced.

Table 2 shows how the relationship between the tensile strength of the negative current collector and the density of the negative active material layer or the weight of the negative active material layer affects the high-temperature cycle expansion rate and the overcharge deformation rate of the lithium-ion battery. Embodiment 2-1 to Embodiment 2-14 differ from Embodiment 1-1 merely in the parameters listed in Table 2.

TABLE 2

|  | F (N/mm$^2$) | W (mg/cm$^2$) | F/W | D (g/cm$^3$) | F × D | High-temperature cycle expansion rate | Overcharge deformation rate |
| --- | --- | --- | --- | --- | --- | --- | --- |
| Embodiment 1-1 | 100 | 4 | 25 | 1.6 | 160 | 12.2% | 10.1% |
| Embodiment 2-1 | 400 | 6 | 66.7 | 1.4 | 560 | 11.4% | 9.6% |
| Embodiment 2-2 | 400 | 8 | 50 | 1.6 | 640 | 10.5% | 9.3% |
| Embodiment 2-3 | 400 | 10 | 40 | 1.6 | 640 | 9.2% | 9.1% |
| Embodiment 2-4 | 400 | 12 | 33.3 | 1.6 | 640 | 9.1% | 8.8% |
| Embodiment 2-5 | 500 | 8 | 62.5 | 1.8 | 900 | 10.5% | 9.2% |
| Embodiment 2-6 | 600 | 8 | 75 | 1.8 | 1080 | 11.1% | 9.6% |
| Embodiment 2-7 | 800 | 8 | 100 | 1.8 | 1440 | 11.3% | 9.9% |
| Embodiment 2-8 | 1000 | 8 | 125 | 1.8 | 1800 | 10.1% | 9.5% |
| Embodiment 2-9 | 1200 | 8 | 150 | 1.8 | 2160 | 11.1% | 9.3% |

TABLE 2-continued

|  | F (N/mm$^2$) | W (mg/cm$^2$) | F/W | D (g/cm$^3$) | F × D | High-temperature cycle expansion rate | Overcharge deformation rate |
|---|---|---|---|---|---|---|---|
| Embodiment 2-10 | 1500 | 8 | 187.5 | 1.6 | 2400 | 13.4% | 11.9% |
| Embodiment 2-11 | 1600 | 8 | 200 | 1.6 | 2560 | 16.5% | 14.6% |
| Embodiment 2-12 | 400 | 6 | 66.7 | 1.3 | 520 | 10.8% | 8.9% |
| Embodiment 2-13 | 400 | 6 | 66.7 | 2.0 | 800 | 10.9% | 9.2% |
| Embodiment 2-14 | 400 | 6 | 66.7 | 2.2 | 880 | 11.1% | 10.1% |

The test results show that the high-temperature cycle expansion rate and the overcharge deformation rate of the lithium-ion battery can be further reduced when the tensile strength (F N/mm$^2$, F≥400) of the negative current collector, the density (D g/cm$^3$, D is 1.4 to 2.0) of the negative active material layer, and the weight per unit area (W mg/cm$^2$) of the negative active material layer satisfies 100/3≤F/W≤150 and/or 560≤F×D≤1800.

Table 3 shows how the ingredients of the electrolytic solution affects the high-temperature cycle expansion rate and the overcharge deformation rate of the lithium-ion battery. Embodiment 3-1 to Embodiment 3-31 differ from Embodiment 1-1 merely in the parameters listed in Table 3.

TABLE 3

|  | Propionate (20%) | Organic compound containing a cyano group (2%) | LiPO$_2$F$_2$ (0.5%) | Compound represented by Formula 1 (0.5%) | High-temperature cycle expansion rate | Overcharge deformation rate |
|---|---|---|---|---|---|---|
| Embodiment 1-1 | / | / | / | / | 12.2% | 10.1% |
| Embodiment 3-1 | PP | / | / | / | 11.6% | 9.5% |
| Embodiment 3-2 | EP | / | / | / | 11.3% | 9.1% |
| Embodiment 3-3 | / | ADN | / | / | 10.9% | 9.2% |
| Embodiment 3-4 | / | SN | / | / | 10.3% | 8.9% |
| Embodiment 3-5 | / | HTCN | / | / | 10.1% | 9.0% |
| Embodiment 3-6 | / | EDN | / | / | 10.2% | 9.2% |
| Embodiment 3-7 | / | TCEP | / | / | 9.8% | 9.6% |
| Embodiment 3-8 | / | / | LiPO$_2$F$_2$ | / | 10.2% | 8.5% |
| Embodiment 3-9 | / | / | / | Formula 1-1 | 9.6% | 9.1% |
| Embodiment 3-10 | / | / | / | Formula 1-2 | 9.4% | 9.4% |
| Embodiment 3-11 | / | / | LiPO$_2$F$_2$ | Formula 1-1 | 9.1% | 9.3% |
| Embodiment 3-12 | PP | ADN | / | / | 8.4% | 8.2% |
| Embodiment 3-13 | PP | SN | / | / | 8.2% | 7.8% |
| Embodiment 3-14 | PP | HTCN | / | / | 8.1% | 7.5% |
| Embodiment 3-15 | PP | EDN | / | / | 7.9% | 8.4% |
| Embodiment 3-16 | PP | TCEP | / | / | 7.5% | 8.0% |
| Embodiment 3-17 | PP | / | LiPO$_2$F$_2$ | / | 8.1% | 8.1% |
| Embodiment 3-18 | PP | / | / | Formula 1-1 | 7.9% | 8.0% |
| Embodiment 3-19 | PP | / | / | Formula 1-2 | 7.8% | 7.5% |
| Embodiment 3-20 | PP | / | LiPO$_2$F$_2$ | Formula 1-1 | 7.6% | 7.3% |
| Embodiment 3-21 | / | HTCN | LiPO$_2$F$_2$ | / | 7.2% | 7.1% |
| Embodiment 3-22 | / | HTCN | / | Formula 1-1 | 7.2% | 6.8% |
| Embodiment 3-23 | / | HTCN | / | Formula 1-2 | 7.1% | 7.1% |
| Embodiment 3-24 | / | HTCN | LiPO$_2$F$_2$ | Formula 1-1 | 6.9% | 7.1% |
| Embodiment 3-25 | / | TCEP | / | Formula 1-1 | 6.8% | 6.0% |
| Embodiment 3-26 | / | TCEP | / | Formula 1-2 | 6.3% | 5.8% |
| Embodiment 3-27 | / | TCEP | LiPO$_2$F$_2$ | Formula 1-1 | 6.2% | 6.1% |
| Embodiment 3-28 | PP | TCEP | LiPO$_2$F$_2$ | / | 5.8% | 6.1% |
| Embodiment 3-29 | PP | TCEP | / | Formula 1-1 | 5.2% | 5.1% |
| Embodiment 3-30 | PP | HTCN | LiPO$_2$F$_2$ | Formula 1-1 | 5.1% | 5.0% |
| Embodiment 3-31 | PP | TCEP | LiPO$_2$F$_2$ | Formula 1-1 | 5.0% | 5.0% |

"/" means that the substance is not added or this feature is not applicable.

The test results show that the high-temperature cycle expansion rate and the overcharge deformation rate of the lithium-ion battery can be further reduced when: (i) a slightly conductive material exists between the negative active material layer and the negative current collector; (ii) the weight per unit area of the negative active material layer is in a range of 3 mg/cm² to 12 mg/cm²; and (iii) the electrolytic solution contains propionate, the organic compound with a cyano group, lithium difluorophosphate and/or the compound represented by Formula 1.

Table 4 shows how the relationship between the content (a %) of the organic compound containing a cyano group and the weight per unit area (F N/mm²) of the negative active material layer affects the high-temperature cycle expansion rate and the overcharge deformation rate of the lithium-ion battery. Embodiment 4-1 to Embodiment 4-9 differ from Embodiment 1-1 merely in the parameters listed in Table 4.

TABLE 4

|  | Organic compound containing a cyano group | | W (mg/cm²) | W/a | High-temperature cycle expansion rate | Overcharge deformation rate |
| --- | --- | --- | --- | --- | --- | --- |
|  | Type | Content a (%) | | | | |
| Embodiment 1-1 | / | / | 4 | ∞ | 12.2% | 10.1% |
| Embodiment 4-1 | SN | 1 | 8 | 8 | 10.7% | 9.1% |
| Embodiment 4-2 | SN | 2 | 8 | 4 | 10.3% | 8.9% |
| Embodiment 4-3 | SN | 4 | 8 | 2 | 9.3% | 8.5% |
| Embodiment 4-4 | SN | 6 | 8 | 1.3 | 9.2% | 8.1% |
| Embodiment 4-5 | ADN | 6 | 8 | 1.3 | 9.5% | 8.4% |
| Embodiment 4-6 | TCEP | 0.5 | 8 | 16 | 9.9% | 9.1% |
| Embodiment 4-7 | HTCN | 0.4 | 8 | 20 | 10.2% | 9.0% |
| Embodiment 4-8 | SN + EDN | 10 + 5 | 4 | 0.26 | 11.5% | 9.3% |
| Embodiment 4-9 | HTCN | 0.4 | 12 | 30 | 10.9% | 9.9% |

The test results show that the high-temperature cycle expansion rate and the overcharge deformation rate of the lithium-ion battery can be further reduced when the relationship between the content (a %) of the organic compound containing a cyano group and the weight per unit area (F N/mm²) of the negative active material layer satisfies $0.3 \leq W/a \leq 20$.

Table 5 shows how the binder between the negative current collector and the negative active material layer affects the high-temperature cycle expansion rate and the overcharge deformation rate of the lithium-ion battery. Embodiment 5-1 to Embodiment 5-5 differ from Embodiment 1-1 merely in the parameters listed in Table 5.

TABLE 5

|  | Binder | Decomposition temperature | High-temperature cycle expansion rate | Overcharge deformation rate |
| --- | --- | --- | --- | --- |
| Embodiment 1-1 | Styrene-butadiene rubber | 300° C. | 12.2% | 10.1% |
| Embodiment 5-1 | Hydroxyethyl chitosan | 160° C. | 8.6% | 8.5% |
| Embodiment 5-2 | Hydroxypropyl chitosan | 180° C. | 7.2% | 7.9% |
| Embodiment 5-3 | Hydroxybutyl chitosan | 200° C. | 6.7% | 7.1% |
| Embodiment 5-4 | Ethylene glycol dimethacrylate | 210° C. | 5.8% | 6.9% |
| Embodiment 5-5 | Propylene glycol dimethacrylate | 220° C. | 5.5% | 6.5% |

The test results show that the high-temperature cycle expansion rate and the overcharge deformation rate of the lithium-ion battery can be further reduced when an organic binder evaporable or decomposable at a specific temperature is used, especially decomposable at a temperature of 160° C. to 300° C.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment(s) or example(s) in this application. In addition, specific features, structures, materials, or characteristics herein may be combined in one or more embodiments or examples in any appropriate manner.

Although illustrative embodiments have been demonstrated and described above, a person skilled in the art understands that the above embodiments are not to be construed as a limitation on this application, and changes, replacements, and modifications may be made to the embodiments without departing from the spirit, principles, and scope of this application.

What is claimed is:

1. An electrochemical device, comprising: a positive electrode, a negative electrode, and an electrolytic solution;
   wherein the negative electrode comprises a negative current collector and a negative active material layer formed on the negative current collector, and the negative active material layer contains a negative active material;
   a conductive material is disposed between the negative active material layer and the negative current collector, and an average particle diameter of the conductive material is smaller than that of the negative active material;
   a weight per unit area of the negative active material layer is W mg/cm$^2$, wherein W is within a range of 3 to 12; and
   a tensile strength of the negative current collector is F N/mm$^2$, wherein F is greater than or equal to 400 and $100/3 \leq F/W \leq 150$;
   and wherein a part of the negative active material layer is sandwiched in the conductive material, and the conductive material is located in a region within 3 μm below a surface of the negative current collector; wherein, in the region, a content of the part of the negative active material sandwiched in the conductive material, based on a total volume of solid content materials, is greater than 0 and less than 10 vol %.

2. The electrochemical device according to claim 1, wherein the average particle diameter of the conductive material is less than or equal to 1 μm.

3. The electrochemical device according to claim 1, wherein the conductive material comprises at least one of carbon black, carbon fiber, graphene, or carbon nanotube.

4. The electrochemical device according to claim 1, further comprising a binder disposed between the negative active material layer and the negative current collector.

5. The electrochemical device according to claim 4, wherein the binder comprises at least one of styrene-butadiene rubber, a styrene-butyl acrylate copolymer, a styrene-(meth) acrylate copolymer, carboxymethyl cellulose, polyvinyl alcohol, polyacrylic acid sodium, polyvinylidene difluoride, polyimide, polyamide imide, or chitosan.

6. The electrochemical device according to claim 4, wherein the binder comprises an organic binder that is vaporizable or decomposable.

7. The electrochemical device according to claim 6, wherein the organic binder comprises at least one of a chitin-chitosan derivative, fluorine-containing resin, synthetic rubber, polyamide, polyimide, polyolefin, or polyacrylic resin.

8. The electrochemical device according to claim 1, wherein density of the negative active material layer is D g/cm$^3$, D is within a range of 1.4 to 2.0, and $560 \leq F \times D \leq 1800$.

9. The electrochemical device according to claim 1, wherein the electrolytic solution comprises at least one of the following compounds:
   (a) propionate;
   (b) an organic compound containing a cyano group;
   (c) lithium difluorophosphate; and
   (d) a compound represented by Formula 1:

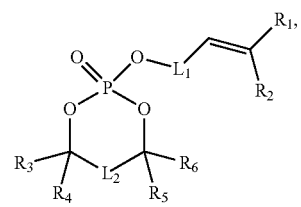

Formula 1 wherein
$R^1$, $R^2$, $R^3$, $R^4$, $R^5$, and $R^6$ are each independently hydrogen or a $C_1$ to $C_{10}$ alkyl group;
$L_1$ and $L_2$ are each independently $—(CR^7R^8)_n—$;
$R^7$ and $R^8$ are each independently hydrogen or a $C_1$ to $C_{10}$ alkyl group; and
n is 1, 2, or 3.

10. The electrochemical device according to claim 9, wherein the compound represented by Formula 1 comprises at least one of the following compounds:

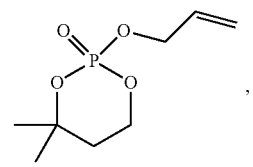

Formula 1-1

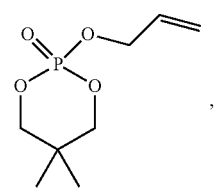

Formula 1-2

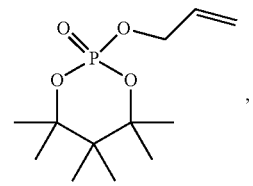

Formula 1-3

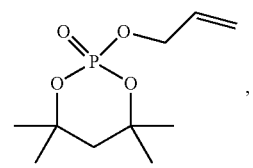

Formula 1-4

-continued

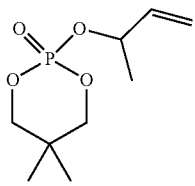

Formula 1-5

, and

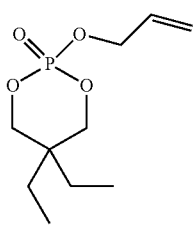

Formula 1-6

11. The electrochemical device according to claim 9, wherein, based on a weight of the electrolytic solution, a content of the organic compound containing a cyano group is a %, wherein a is within a range of 0.1 to 10.

12. The electrochemical device according to claim 11, wherein $0.3 \leq W/a \leq 20$.

13. An electronic device, comprising an electrochemical device, comprising: a positive electrode, a negative electrode, and an electrolytic solution;
wherein the negative electrode comprises a negative current collector and a negative active material layer formed on the negative current collector, and the negative active material layer contains a negative active material;
a conductive material is disposed between the negative active material layer and the negative current collector, and an average particle diameter of the conductive material is smaller than that of the negative active material;
a weight per unit area of the negative active material layer is W mg/cm$^2$, wherein W is within a range of 3 to 12; and
a tensile strength of the negative current collector is F N/mm$^2$, wherein F is greater than or equal to 400 and $100/3 \leq F/W \leq 150$;
and wherein a part of the negative active material layer is sandwiched in the conductive material, and the conductive material is located in a region within 3 μm below a surface of the negative current collector; wherein, in the region, a content of the part of the negative active material sandwiched in the conductive material, based on a total volume of solid content materials, is greater than 0 and less than 10 vol %.

14. The electronic device according to claim 13, wherein the average particle diameter of the conductive material is less than or equal to 1 μm.

15. The electronic device according to claim 13, wherein the conductive material comprises at least one of carbon black, carbon fiber, graphene, or carbon nanotube.

16. The electronic device according to claim 13, further comprising a binder disposed between the negative active material layer and the negative current collector.

17. The electronic device according to claim 16, wherein the binder comprises at least one of styrene-butadiene rubber, a styrene-butyl acrylate copolymer, a styrene-(meth)acrylate copolymer, carboxymethyl cellulose, polyvinyl alcohol, polyacrylic acid sodium, polyvinylidene difluoride, polyimide, polyamide imide, or chitosan.

18. The electronic device according to claim 16, wherein the binder comprises an organic binder that is vaporizable or decomposable.

19. The electronic device according to claim 18, wherein the organic binder comprises at least one of a chitin-chitosan derivative, fluorine-containing resin, synthetic rubber, polyamide, polyimide, polyolefin, or polyacrylic resin.

* * * * *